United States Patent
Jung et al.

(10) Patent No.: US 8,701,100 B2
(45) Date of Patent: Apr. 15, 2014

(54) PRINT CONTROLLING DEVICE, IMAGE FORMING SYSTEM AND METHOD FOR UPGRADING

(75) Inventors: Hee-chul Jung, Suwon-si (KR); Hyung-jong Kang, Seoul (KR); In-chang Park, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 611 days.

(21) Appl. No.: 12/923,685

(22) Filed: Oct. 4, 2010

(65) Prior Publication Data

US 2011/0239208 A1    Sep. 29, 2011

(30) Foreign Application Priority Data

Mar. 25, 2010  (KR) .................. 10-2010-0026787

(51) Int. Cl.
*G06F 9/44* (2006.01)
(52) U.S. Cl.
USPC .......................................................... 717/170
(58) Field of Classification Search
None
See application file for complete search history.

(56) References Cited

U.S. PATENT DOCUMENTS

| 2003/0142351 | A1* | 7/2003 | Sakura ..................... 358/1.15 |
| 2005/0190393 | A1 | 9/2005 | Bledsoe et al. |
| 2006/0017951 | A1 | 1/2006 | Tanaka |
| 2006/0244986 | A1* | 11/2006 | Ferlitsch ................. 358/1.13 |
| 2010/0094979 | A1* | 4/2010 | Azami ..................... 709/221 |
| 2010/0220352 | A1* | 9/2010 | Hyo ......................... 358/1.15 |
| 2011/0072423 | A1* | 3/2011 | Fukata ...................... 717/172 |

FOREIGN PATENT DOCUMENTS

| EP | 1 387 268 | 2/2004 |
| EP | 2 034 402 | 3/2009 |
| JP | 2006-039647 | 2/2006 |

* cited by examiner

*Primary Examiner* — Philip Wang
(74) *Attorney, Agent, or Firm* — Staas & Halsey LLP

(57) ABSTRACT

A print controlling device is provided. The present print controlling device includes a storage unit to store information regarding software or firmware installed in an image forming apparatus, a search unit to search and identify whether there is firmware version newer than or later than that installed in the image forming apparatus using the stored firmware information, a determination unit to determine whether the searched or identified firmware of the newer or latest version is compatible with an application program installed in the print controlling device using compatibility information when firmware of the newer or latest version is identified, an interface unit to request and receive firmware of the newer or latest version from a firmware providing server according to the determination result, and an upgrade unit to upgrade the firmware of the image forming apparatus using the received firmware of the newer or latest version.

24 Claims, 28 Drawing Sheets

FIG. 17

| Firmware version | Software version | | Update dependency |
|---|---|---|---|
| | Smart Panel | Installer | |
| v1.01.00.77 | 1.23.07 | 3.00.21.02 | X |
| v1.01.00.72 | 1.23.03 | 3.00.21.02 | X |
| v1.01.00.68 | 1.23.02 | 3.00.20.02 | O |
| v1.01.00.63 | 1.22.05 | 3.00.19.00 | X |

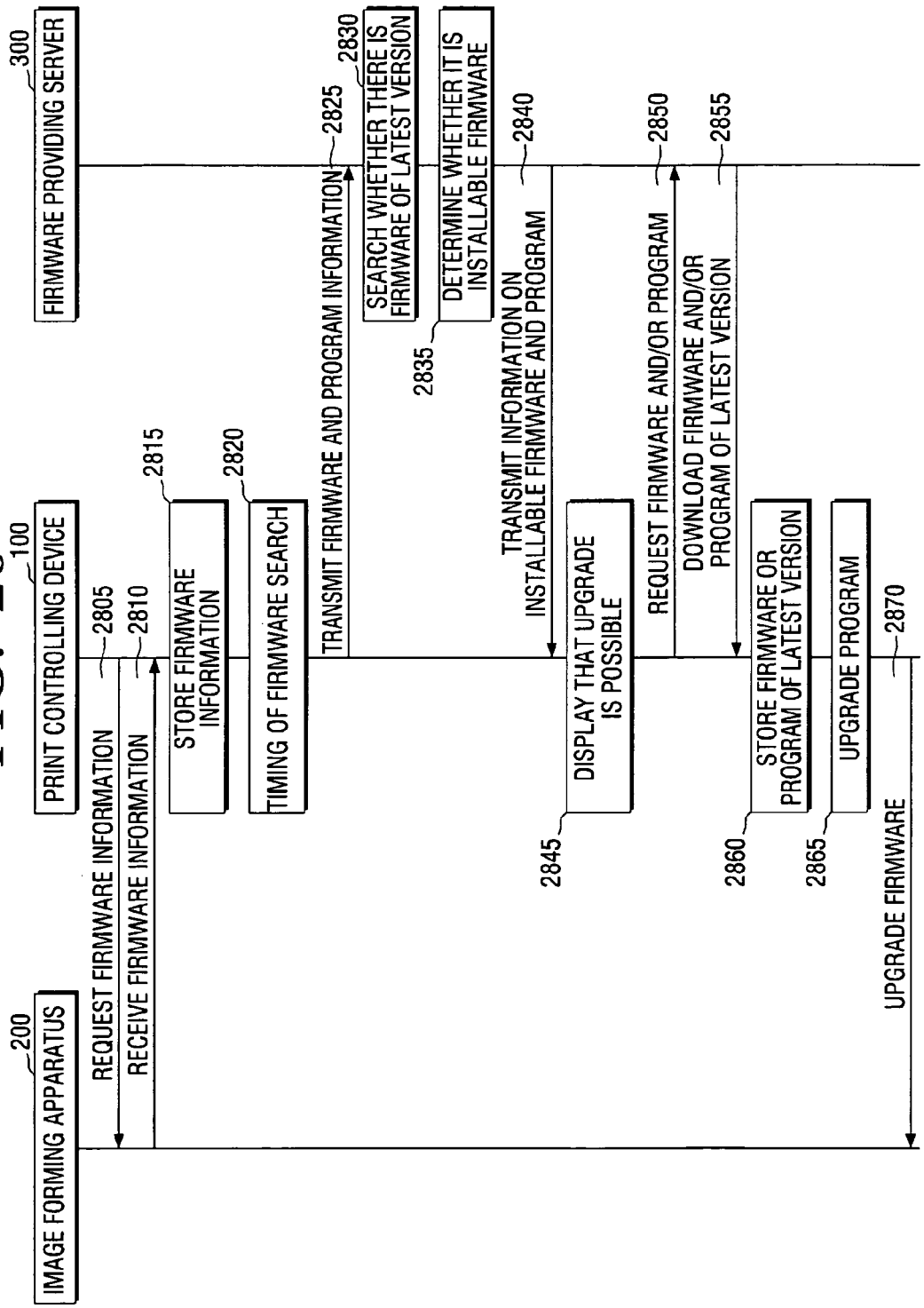

PRINT CONTROLLING DEVICE, IMAGE FORMING SYSTEM AND METHOD FOR UPGRADING

CROSS-REFERENCE TO RELATED APPLICATIONS

This application claims the benefit of Korean Patent Application No. 10-2010-0026787, filed in the Korean Intellectual Property Office on Mar. 25, 2010, the disclosure of which is incorporated herein by reference.

BACKGROUND

1. Field

Aspects of the embodiments relate to a print controlling device and a method for upgrading a program, and more particularly, to a print controlling device and a method for upgrading firmware which determines whether the latest firmware version is compatible with the program related to the image forming apparatus of the print controlling device and upgrades the firmware of the image forming apparatus.

2. Description of the Related Art

An image forming apparatus is an apparatus to print data generated from a device, such as a computer, on a recoding paper, and the examples of the image forming apparatus include a copier, printer, a fax machine, and a multi-functional printer combining the functions of the above apparatuses.

In general, the image forming apparatus, such as a copier, a printer, and a fax machine uses firmware which is stored in a flash ROM or EEPROM. The firmware is continuously upgraded to enhance the performance of the image forming apparatus.

Conventionally, the firmware of the image forming apparatus has been upgraded to the latest version by downloading it from a network or the print controlling device. Upgrading the firmware to the latest version on every occasion, however, prolongs updating time and may cause unnecessary updates.

Specifically, firmware, a driver and an application program need to maintain dependency for each model function. That is, a product can be operated properly only after the product acquires compatibility through upgrading of functions. If a new function is added to the image forming apparatus, the application program related to the new function should be compatible with the firmware in order for the new function to be used. If the firmware version supports the new function but is not supported by the program, the product cannot be operated properly.

In this regard, the firmware of the image forming apparatus may be upgraded unnecessarily if the firmware of the image forming apparatus is upgraded while the application program of the print controlling device is not upgraded,

SUMMARY

Additional aspects and/or advantages will be set forth in part in the description which follows and, in part, will be apparent from the description, or may be learned by practice of the invention.

Aspects relate to a print controlling device and a method for upgrading firmware which determines whether the latest firmware version is compatible with the program related to the image forming apparatus of the print controlling device and upgrades the firmware of the image forming apparatus.

A method for upgrading firmware of an image forming apparatus using a print controlling device, according to an exemplary embodiment, includes receiving information regarding firmware installed in the image forming apparatus, searching to determine or identify whether there is a firmware version newer than that installed in the image forming apparatus using the received firmware information, determining whether the searched or identified firmware of the latest version is compatible with a program installed in the print controlling device using compatibility information when firmware of the latest version is found, receiving the firmware of the version from a firmware providing server according to the determination result, and upgrading the firmware of the image forming apparatus using the received firmware of the latest version.

The compatibility information may be information regarding program versions supported by each version of firmware of the image forming apparatus.

The information regarding the installed firmware may be at least one of an MAC address, a model code, a model number and a serial number of the image forming apparatus.

The searching includes providing the firmware information to the firmware providing server and receiving information regarding or identifying firmware of the latest version and information regarding the compatibility from the firmware providing server.

The searching may include providing information regarding the firmware and a program installed in the print controlling device to the firmware providing server, and receiving information regarding firmware of the latest version which is compatible with the program installed in the print controlling device from the firmware providing server.

The print controlling device may be connectable to a plurality of image forming apparatuses, and the searching may search whether there is firmware of the latest version for each of the plurality of image forming apparatuses and the determining may determine whether each of searched firmware of the latest version is compatible with a program installed in the print controlling apparatus.

The upgrading firmware may firstly (or with a highest priority) upgrade firmware of a recently used image forming apparatus and a default image forming apparatus.

The print controlling device may include a plurality of user accounts and programs corresponding to each user account, and the determining may determine whether the searched firmware of the latest version is compatible with a program corresponding to a current user account.

The method may further include searching or identifying whether there is a program version newer than that of installed in the print controlling device, and the determining may determine whether the searched the program (or firmware of the version) is compatible with the searched program of the version if the program version (or the firmwares version) is searched.

The method may further include receiving an application program of the latest version from the firmware providing server according to the determination result and installing the received program of the latest version in the print controlling device.

The program may be at least one of a print driver and a firmware upgrade program.

The method may further include displaying that firmware-updating is possible if the searched firmware of the latest version is compatible with the program installed in the print controlling device.

The method may further include storing the received firmware of the latest version and setting a timing of upgrading firmware, and the upgrading firmware may upgrade firmware of the image forming apparatus using the stored firmware of the latest version at the set timing.

A print controlling device which is connectable to an image forming apparatus and a firmware providing server, according to an exemplary embodiment, includes a storage unit to store information regarding firmware installed in the image forming apparatus, a search unit to search and identify whether there is firmware version newer than that installed in the image forming apparatus using the stored firmware information, a determination unit to determine whether the searched firmware of the latest version is compatible with the program installed in the print controlling device using compatibility information if firmware of the latest version is searched, a communication interface unit to request and receive the firmware of the latest version from the firmware providing server according to determination result, and an upgrade unit to upgrade firmware of the image forming apparatus using the received firmware of the latest version.

The compatibility information may be version information of a supportable program for each firmware of the image forming apparatus.

The information regarding installed firmware may be at least one of an MAC address, a model code, a model number, and a serial number.

The search unit may search firmware of the latest version by controlling the communication interface unit to provide the firmware information to the firmware providing server.

The search unit may search information regarding firmware of the latest version which is compatible with the program installed in the print controlling device by controlling the communication interface unit to provide the firmware information and information regarding the program installed in the print controlling device.

The print controlling device may be connectable to a plurality of image forming apparatuses, and the search unit may search whether there is firmware of the latest version for each of the plurality of image forming apparatus and the determination unit may determine whether each version of searched firmware of the latest version is compatible with the program installed in the print controlling device.

The upgrade unit may firstly upgrade firmware of a recently used image forming apparatus and a default image forming apparatus from among a plurality of image forming apparatuses.

The print controlling device may include a plurality of user accounts and programs corresponding to each user account, and the determination unit may determine whether the searched firmware of the latest version is compatible with a program corresponding to a current user account.

The search unit may search whether there is a program version newer than that installed in the print controlling device, and the determination unit may determine whether the searched firmware of the latest version is compatible with the searched program of the latest version if a program and firmware of the latest version are searched.

The communication interface unit may receive a program of the latest version from the firmware providing server according to the determination result, and the upgrade unit may install the received program of the latest version in the print controlling device.

The program may be at least one of a print driver and a firmware upgrading program.

The print controlling device may further include a user interface unit to display that firmware-upgrading is possible if the searched firmware of the latest version is compatible with the program installed in the print controlling device.

The print controlling device may further include a user interface unit to receive a timing of upgrading firmware, and the storage unit may store the received firmware of the latest version and the upgrade unit may upgrade firmware of the image forming apparatus using the stored firmware of the latest version at the set timing for upgrading.

BRIEF DESCRIPTION OF THE DRAWINGS

These and/or other aspects and advantages will become apparent and more readily appreciated from the following description of the embodiments, taken in conjunction with the accompanying drawings of which:

FIG. 17 is a view provided to explain compatibility according to an exemplary embodiment;

FIG. 26 is a sequence diagram provided to explain a method for upgrading firmware according to an exemplary embodiment;

FIG. 27 is a sequence diagram provided to explain a method for upgrading firmware according to the second exemplary embodiment; and FIG. 28 is a sequence diagram provided to explain a method for upgrading firmware according to the third exemplary embodiment.

DETAILED DESCRIPTION

Figure 1:
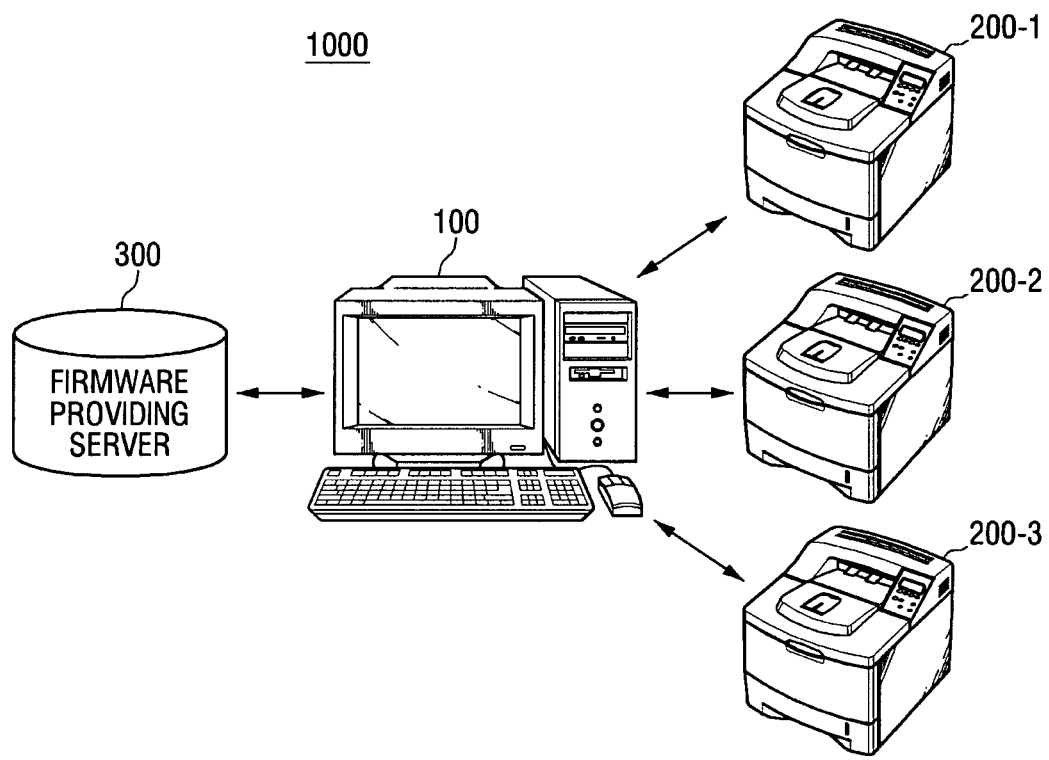
FIG. 1 is a block diagram illustrating an image forming system according to an exemplary embodiment.

Reference will now be made in detail to the exemplary embodiments, examples of which are illustrated in the accompanying drawings, wherein like reference numerals refer to like elements throughout. The embodiments are described below, in order to explain the present invention by referring to the figures.

FIG. 1 is a block diagram illustrating an image forming system according to an exemplary embodiment. Referring to FIG. 1, the image forming system 1000 comprises a print controlling device 100, an image forming apparatus 200-1, 200-2, and 200-3 and a firmware providing server 300.

The print controlling device 100 is connected to at least one of the image forming apparatus 200-1, 200-2, and 200-3 and a firmware providing server 300, receives the latest firmware version which is compatible with 'a program (or software) installed in relation with the image forming apparatus' from the firmware providing server 300 from among a plurality of firmware provided by the firmware providing server 300, and may upgrade (or update) the firmware of the image forming apparatus using the received firmware. The detailed structure and operation of the print controlling device 100 will be described with reference to FIG. 2. The print controlling device 100 may be a management server taking the form of a server.

The image forming apparatus 200-1, 200-2, and 200-3 are connected to the print controlling device 100, and may transmit information regarding the firmware installed in the image forming apparatus 200-1, 200-2, and 200-3 to the print controlling device 100 according to the request from the print controlling device 100 and upgrade the firmware by receiving the latest firmware version from the print controlling device 100.

The image forming apparatus 200-1, 200-2, and 200-3 may be a copier, a printer, a fax machine, and a multi-functional printer combining the functions of the above apparatuses.

The firmware providing server 300 stores a plurality of firmware which can be installed in the image forming apparatus 200-1, 200-2, and 200-3. Specifically, the firmware providing server 300 may store various versions of firmware for each model of the image forming apparatus 200.

In addition, the firmware providing server 300 may store a plurality of programs which can be installed in the print controlling device 100. Specifically, the firmware providing server 300 may store various versions of programs for each model of the image forming apparatus 200. The programs here refer to programs to control the functions of the image forming apparatus or programs to manage the image forming apparatus, and may be a program for upgrading a printer driver and firmware, a program for acquiring firmware information, a background program for confirming an upgrade, and an application program for controlling scanning.

The firmware providing server 300 may search whether there is a firmware version newer than the firmware installed in the image forming apparatus 200-1, 200-2, and 200-3. Specifically, the firmware providing server 300 may search whether there is a firmware version newer than the firmware installed in the image forming apparatus 200-1, 200-2, and 200-3 based on the firmware information received from the print controlling device 100, and provide the information regarding the searched latest firmware to the print controlling device 100.

The firmware providing server 300 may search whether there is a firmware version newer than the firmware installed in the print controlling device 100. Specifically, the firmware providing server 300 may search whether there is a firmware version newer than the firmware installed in the print controlling device 100 based on the program information received from the print controlling device 100, and provide the information regarding the searched latest program to the print controlling device 100.

Once the firmware providing server 300 searches the firmware of the latest version, the firmware providing server 300 may determine whether the firmware of the latest version is compatible with the program installed in the print controlling device 100. Specifically, the firmware providing server 300 stores information regarding compatibility which is information regarding the version of program for each firmware version of the image forming apparatus, and may determine whether the firmware of the searched latest version is compatible with the program installed in the print controlling device 100 based on the stored compatibility information, the firmware information received from the print controlling device 100, and the program information. In addition, the firmware providing server 300 may provide the information regarding the firmware of the searched latest version and the information regarding whether the firmware is compatible or not to the print controlling device 100.

Once the firmware of the latest or newer version and the program of the latest or newer version are identified together, the firmware providing server 300 may determine whether the firmware of the latest version is compatible with the program of the latest version. In addition, the firmware providing server 300 may provide the information regarding the firmware of the latest version, the information regarding the program of the latest version, and the information regarding whether the firmware is compatible with the program of the latest version to the print controlling device 100. Once the firmware providing server 300 receives a request to transmit the firmware of the latest version and/or a request to transmit the program of the latest version from the print controlling device 100, the firmware providing server 300 may transmit the firmware of the latest version and/or the program of the latest version, requested from the print controlling device 100, to the print controlling device 100.

In explaining FIG. 1, the firmware providing server 300 determines whether the firmware of the latest version is compatible with the program installed in the print controlling device 100. However, such operation may be performed by the print controlling device 100. specifically, the print controlling device 100 may receive the information regarding firmware of the searched or identified latest version and the compatibility information corresponding to the firmware from the firmware providing server 300 and determine whether the firmware of the latest version is compatible with the pre-installed program.

In explaining FIG. 1, the image forming apparatus 200-1, 200-2, and 2003 are directly connected to the print controlling device 100. However, more than 3 image forming apparatuses may be connected to the print controlling device 100, and they may be connected directly or indirectly through a router. In addition, the image forming apparatus 200-1, 200-2, and 200-3 and/or are described to have the same structure in FIG. 1. However, each of the 3 image forming apparatus may be a different apparatus having different functions, such as a copier, a printer (a laser printer or an inkjet printer), a fax machine, or a multi-functional printer combining the functions of the above apparatuses.

Figure 2:
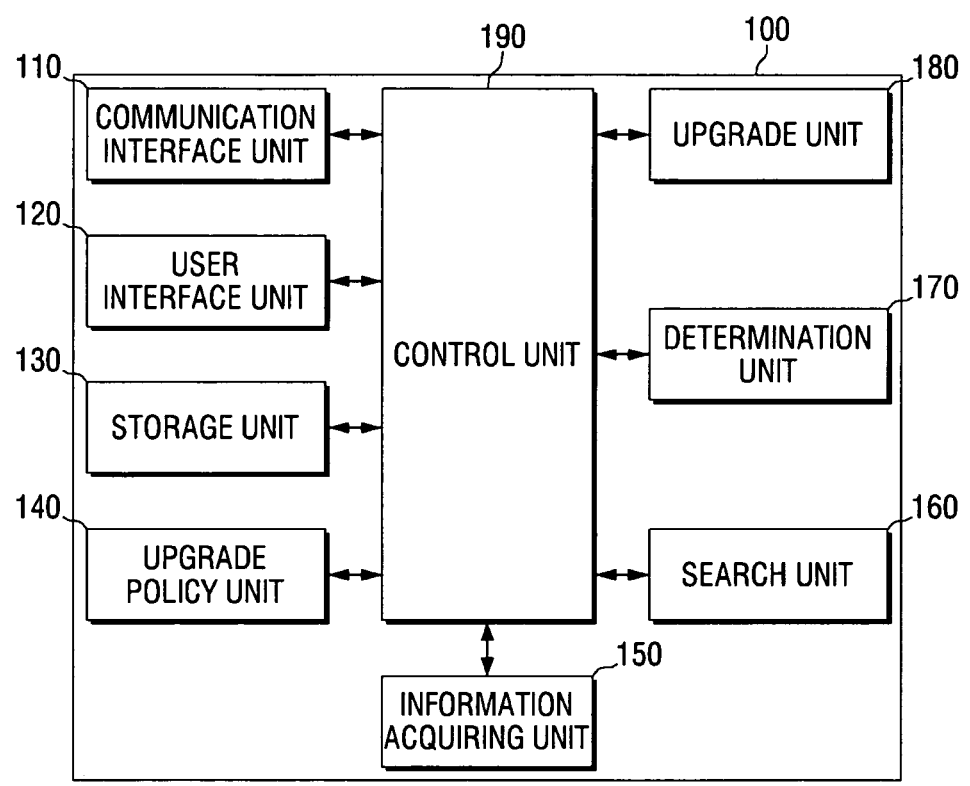
FIG. 2 is a block diagram illustrating the detailed structure of the print controlling device in FIG. 1.

FIG. 2 is a block diagram illustrating the structure of the print controlling device according to an exemplary embodiment.

Referring to FIG. 2, the print controlling device 100 may include a communication interface unit 110, a user interface unit 120, a storage unit 130, an upgrade policy unit 140, an information acquiring unit 150, a search unit 160, a determination unit 170, an upgrade unit 180, and a control unit 190.

The communication interface unit 110 is formed to connect the print controlling device 100 to a plurality of image forming apparatus 200-1, 200-2, and/or 200-3, . . . and the firmware providing server 300, and may connect them wirelessly or with wired through Local Area Network (LAN) and internet network or may connect them through a Universal Serial Bus (USB).

In addition, the communication interface unit 110 may receive information regarding the firmware established in each of the plurality of image forming apparatus 200-1, 200-2, and 200-3. Specifically, the communication interface unit 110 may request to receive information regarding the firmware installed in each of the plurality of the image forming apparatus 200-1, 200-2, and/or 200-3, . . . , and receive the information regarding the firmware from each of the image forming apparatus 200-1, 200-2, and/or 200-3, . . . . The operation of receiving the information regarding the firmware may be performed during the printing process. In this case, the firmware information may be stored (and/or displayed) in the storage unit 130 as registry information.

The communication interface unit 110 may transmit the firmware information received from the image forming apparatus 200-1, 200-2, and/or 200-3, . . . to the firmware providing server 300. If firmware of the latest version exists, the communication interface unit 110 may receive the information regarding the firmware of the latest version from the firmware providing server 300.

The communication interface unit 110 may provide the firmware providing server 300 with the firmware information installed in the image forming apparatus 200-1, 200-2, and/or 200-3, along with the program information installed in the print controlling device 100. If the program information installed in the print controlling device 100 is transmitted to the firmware providing server 300, the operation of determining compatibility of the firmware of the latest version may be performed in the firmware providing server 300 as described above with reference to FIG. 1.

In addition, the communication interface unit 110 may receive information regarding compatibility. Specifically, the communication interface unit 110 may receive from the firmware providing server 300 the information regarding compatibility, that is, the information regarding program versions which can be supported corresponding to the information regarding the firmware of the latest version searched from the firmware providing server 300. The received information regarding compatibility is transmitted to the determination unit 170 and may be used to determine whether the firmware of the searched latest version is compatible with the program installed in the print controlling device 100.

The communication interface unit 110 may receive firmware of the latest version. Specifically, if the determination unit 170 determines that the firmware of the latest version is compatible, the communication interface unit 110 requests the firmware providing server 300 to transmit the firmware of an appropriate version and may receive the firmware of the latest version according to the request. The determination unit 170 will be explained later.

Once the program of the latest version is searched, the communication interface unit 110 requests the firmware providing server 300 to transmit the program of an appropriate version and may receive the program of the latest version.

The communication interface unit 110 may transmit the received firmware of the latest version to the image forming apparatus 200. Specifically, the communication interface unit 110 may upgrade the firmware of the image forming apparatus 200 by transmitting the firmware of the latest version to the image forming apparatus 200 according to the control of the upgrading unit 180.

The user interface unit 120 has a plurality of function keys through which a user may set or select various functions supported by the print controlling device 100, and may display various information provided by the print controlling device 100. The user interface unit 120 may be implemented as a device like a touch pad which can perform input and output simultaneously, or may be implemented as a device combining an input device such as a mouse and a keyboard with a display device such as a CRT monitor, a LCD monitor, and a LED.

The user interface unit 120 may display a user interface window (a UI window) for establishing an upgrade policy of the image forming apparatus, and the upgrade policy may be established through the displayed user interface window. The upgrade policy is a group of items preset by a user to automatically perform an upgrade of the firmware of the image forming apparatus 200 or the program installed in the print controlling device 100, and may include items such as the frequency of performing an upgrade search, the information regarding whether to download the firmware of the latest version if any, the information regarding the timing of installing the downloaded firmware and program, and the information regarding priority.

The user interface unit 120 may display the results of searching firmware. Specifically, the user interface unit 120 may display the result of searching whether there is a newer version of firmware than the firmware installed in the image forming apparatus 200 on the user interface window. The search result can be displayed only when there exist the firmware of the latest version, or only when the firmware of the latest version is compatible with (that is, installable in) the program installed in the print controlling device 100.

In addition, the user interface unit 120 may display the results of searching firmware along with the results of searching the program of the latest version. The user interface unit 120 may also display the process of installing the firmware of the latest version. The user interface unit window for establishing an upgrade policy and the user interface unit window for displaying the firmware and/or program of the searched latest version will be described with reference to FIG. 4 to FIG. 16.

Figure 20:
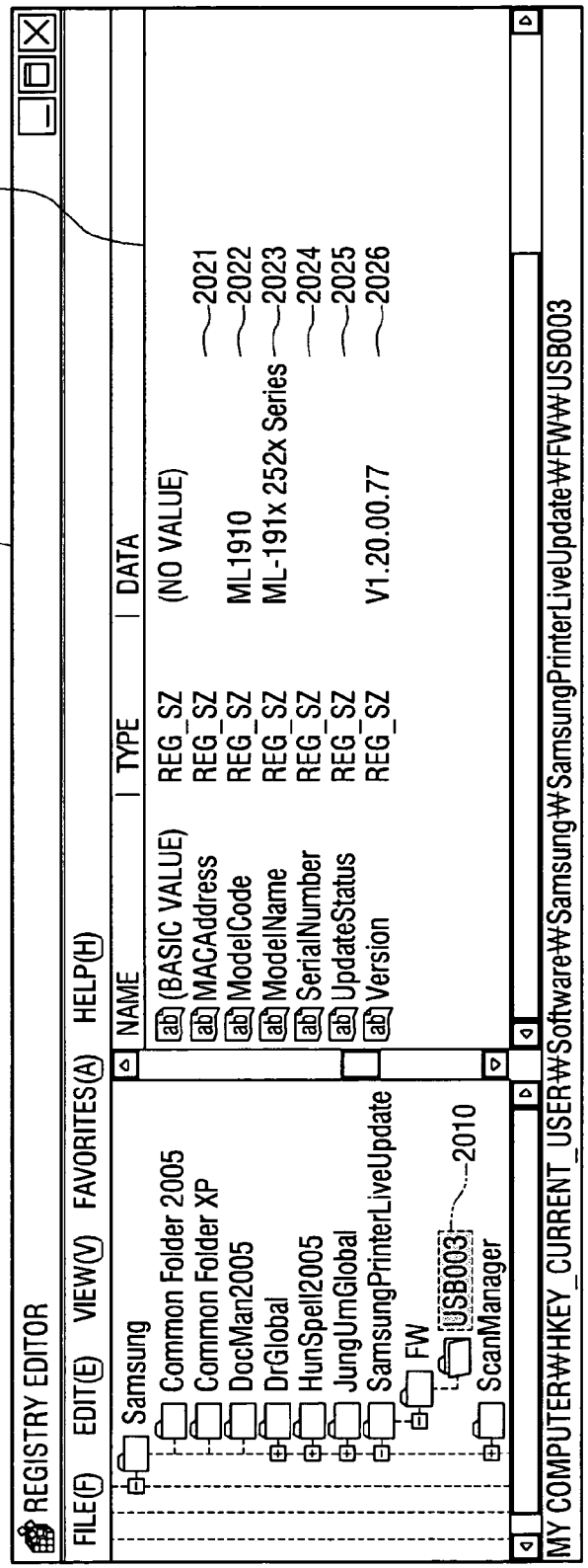
Figure 21:
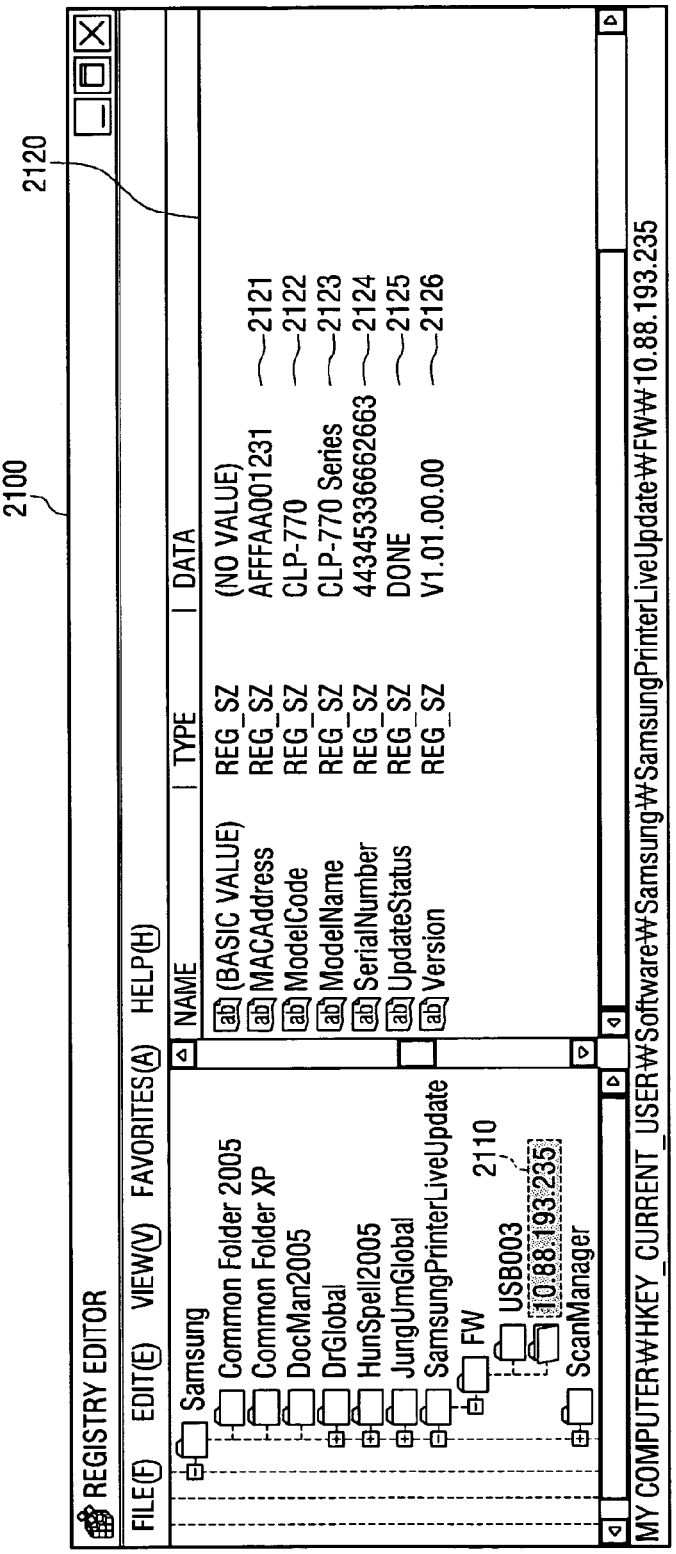

The storage unit 130 may store information regarding the firmware of the image forming apparatus 200. Specifically, the storage unit 130 may store information regarding the firmware of the image forming apparatus 200 received through the communication interface unit 110 in the form of registry as illustrated in FIG. 20 and FIG. 21. The information regarding the firmware may include a MAC address, a model code, and/or serial number of the image forming apparatus 200. Such information regarding the firmware may be stored separately for each image forming apparatus.

Figure 18:
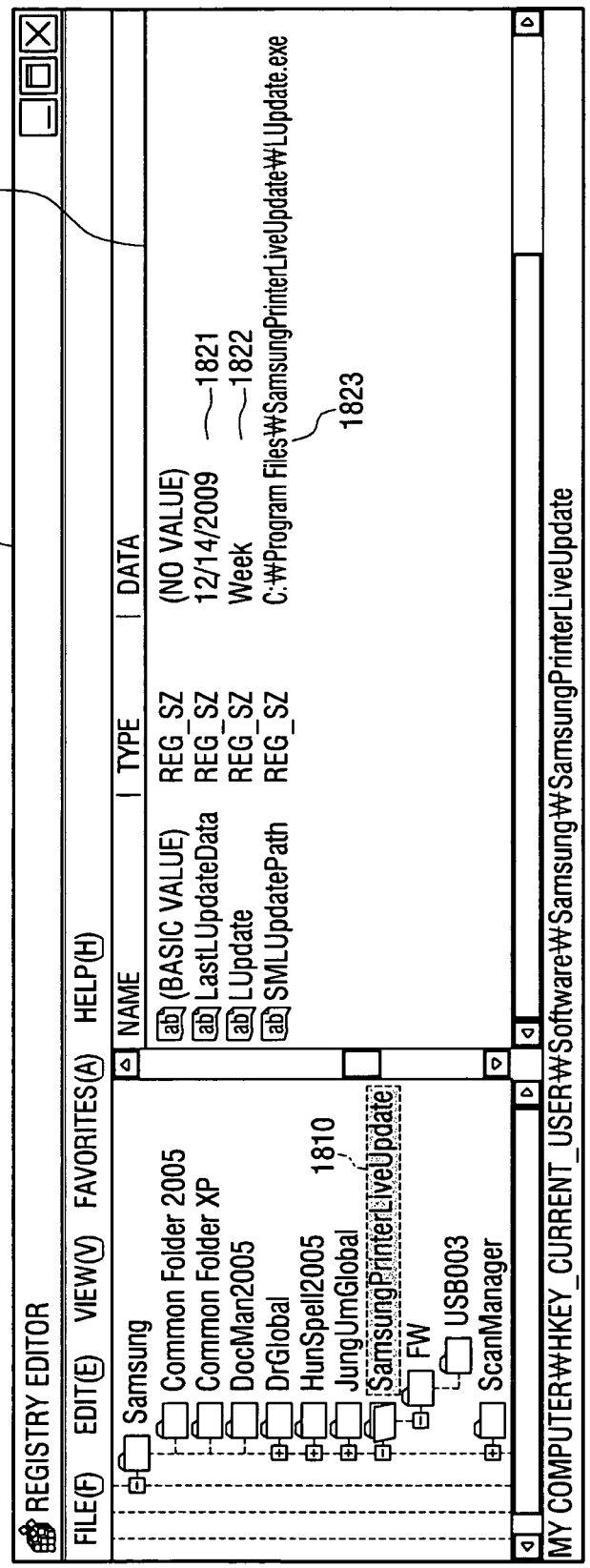
FIG. 18 to FIG. 27 are views illustrating examples of registries stored in the print controlling device in FIG. 1.

The storage unit 130 may store the established upgrade policy. Specifically, the storage unit 130 may store the security policy established through the user interface unit 120 as registry information as illustrated in FIG. 18. The storage unit 130 may store information regarding the program installed in the print controlling device 100 in the form of a registry.

In addition, the storage unit 130 may temporarily store information regarding the firmware of the latest version, the program of the latest version, and compatibility received from the firmware providing server 300. The information regarding compatibility represents information regarding program versions that can be supported in each version of firmware of the image forming apparatus. Examples of compatibility information will be described with reference to FIG. 17. Such information regarding compatibility may be generated and distributed by the manufacturer of the image forming apparatus 200.

The storage unit 130 may be implemented as an internal storage medium of the print controlling device 100 or an external storage medium such as a removable disk including a USB memory, a storage medium connected to a host, and a web server through network.

The upgrade policy unit 140 may determine whether to perform an upgrade for the firmware of the image forming apparatus 200 and the program of the print controlling device 100 according to the upgrade policy set by a user. Specifically, the upgrade policy unit 140 may control the search unit 160 to search the firmware of the latest version considering the information regarding the frequency of upgrading among the established upgrade policy. The upgrade policy unit 140 may be implemented as a background program.

The search unit 160 may search whether there is a newer version of firmware than the firmware installed in the image forming apparatus 200 using the received firmware information. Specifically, the search unit 160 may control the communication interface unit 110 to provide the pre-stored information regarding the firmware of the image forming apparatus 200 to the firmware providing server 300 and search whether there is a newer version of firmware than the firmware installed in the image forming apparatus 200. There may be several version of searched firmware.

The search unit 160 may search whether there is a newer version of firmware than the version of the program installed in the print controlling device 100. Specifically, the search unit 160 may control the communication interface unit 110 to provide the information regarding the version of the program installed in the print controlling device to the firmware providing server 300 and search whether there is a newer version of firmware than the version of the program installed in the print controlling device 100. There may be only one searched program or several searched programs.

If several image forming apparatuses 200 are connected to the print controlling device 100 as illustrated in FIG. 1, the search unit 160 may individually search whether there is a newer version of firmware for each of the firmware of the several image forming apparatuses 200. The search unit 160 may search a plurality of firmware of the newer or latest version all together or sequentially.

Once the firmware of the latest version is searched, the determination unit 170 may determine whether the searched firmware of the latest version is compatible with the program installed in the print controlling device 100 using compatibility information. Specifically, the determination unit 170 may check the program version supported by the firmware of the latest version using the compatibility information which is the information regarding the program versions supported by each version of firmware of the image forming apparatus, and compare the program version supported by the firmware of the latest version with the program version installed in the print controlling device 100 to determine compatibility.

Once the program and the firmware of the latest version are searched, the determination unit 170 may determine whether the firmware of the searched latest version is compatible with the program of the latest version using the compatibility information. In the exemplary embodiment, the search unit 160 and the determination unit 170 are implemented as separate components, but this is only an example. The function of search unit 160 and the determination unit 170 may be combined to be implemented as a single component.

A plurality of user accounts may be set in the print controlling device 100. If there are a plurality of user accounts in the print controlling device 100, the determination unit 170 may determine compatibility between the program corresponding to the accounts of the currently connected users with the firmware of the latest version.

The operation of the determination unit 170 is performed in the firmware providing server 300 and the results of compatibility determination performed in the firmware providing server 300 may be transmitted to the print controlling device 100 and used.

The upgrade unit 180 may receive the firmware of the searched latest version. Specifically, if it is determined that the firmware of the searched latest version is compatible with the program installed in the print controlling device 100, the upgrade unit 180 may control the communication interface unit 110 to download the firmware of the searched latest version from the firmware providing server 300 according to the upgrade policy and a user command. If the program of the latest version is searched, the upgrade unit 180 may also control the communication interface unit to download the program of the latest version from the firmware providing server 300.

In addition, the upgrade unit 180 may upgrade the firmware of the image forming apparatus using the received firmware of the latest version. If the program of the latest versions is received, the upgrade unit 180 may upgrade the pertinent program of the print controlling device 100.

If a plurality of latest versions of firmware of the image forming apparatus are searched, the upgrade unit 180 may upgrade the most recently used image forming apparatus and a default image forming apparatus first according to the priority policy among the upgrade policy.

The control unit 190 may control each component included in the print controlling device 100. Specifically, the control unit 190 may control the user interface unit 190 to display a user interface window for the upgrade policy to be established by a user. Once the upgrade policy is established through the user interface unit 120, the established upgrade policy may be stored in the storage unit 130.

The control unit 190 may control the search unit 160 to search the firmware and/or the program of the latest version according to the information regarding upgrade timing (the timing of upgrading, the predetermined frequency) included in the established upgrade policy or a user's command regarding upgrading. If the firmware and/or the program of the latest version is searched, the control unit 190 may control the determination unit 170 to determine whether the firmware and/or the program of the searched latest version is compatible with the program installed in the print controlling device 100.

If it is determined that the firmware and the program of the searched latest version are compatible, the control unit 190 may control the user interface unit 120 to display that there are installable firmware and program to a user.

The control unit 190 may control the communication interface unit 110 to download the firmware and/or the program of the latest version from the firmware providing server 300 according to the user's selection or the upgrade policy, and may control the upgrade unit 180 to install the received firmware and/or the program of the latest version.

If the received firmware of the latest version fails to be upgraded, the control unit 190 may try to upgrade the firmware again at a predetermined time or according to the user's setting. Specifically, if the pertinent image forming apparatus is not connected to the print controlling device 100 at the time of upgrading firmware or other operation is being performed, the control unit 190 may control the user interface unit 120 to display that firmware-upgrading cannot be performed to a user and perform upgrading of firmware again using the received firmware of the latest version at a predetermined time (for instance, at the predetermined time set by the upgrade policy).

As shown in the above exemplary embodiment, the print controlling device 100 performs firmware-upgrading after examining compatibility of the latest firmware installable in the image forming apparatus 200 and the program installed in the print controlling device 100, and thus unnecessary firmware-upgrading can be prevented.

With reference to FIG. 2, upgrading firmware of an image forming apparatus has been explained. However, the firmware of a plurality of image forming apparatuses may be upgraded sequentially or simultaneously.

Figure 3:
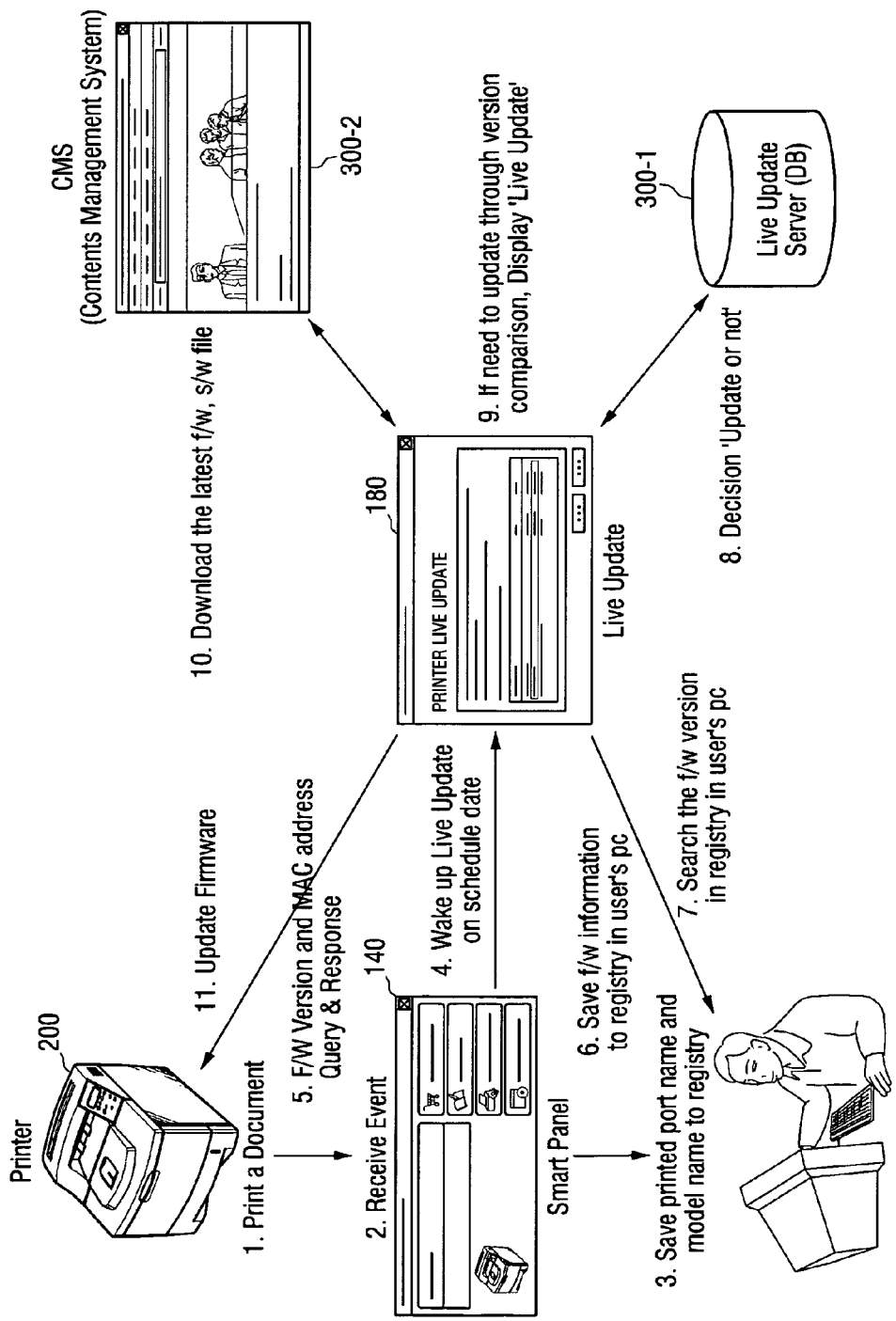
FIG. 3 is a view provided to explain a method for upgrading the firmware of the image forming apparatus according to an exemplary embodiment.

FIG. 3 is a view provided to explain a method for upgrading the firmware of the image forming apparatus according to an exemplary embodiment.

Referring to FIG. 3, printing is performed using the image forming apparatus 200 (1). Accordingly, information regarding firmware of the image forming apparatus 200 may be received (2). Such firmware information may be stored in the print controlling device as registry information (3).

The upgrade policy unit 140 may execute a "firmware upgrade program" at the predetermined upgrade time set by the upgrade policy (4). If the "firmware upgrade program" is performed by the upgrade policy unit 140, the firmware upgrade program may acquire information regarding the firmware of the image forming apparatus (5), and store the acquired firmware information as registry information (6). The above operation is performed when there is no firmware information in the registry information. If information regarding the firmware of the image forming apparatus is already stored through the printing process explained in (1), (2), and (3), (5) and (6) may be omitted.

Subsequently, the "firmware upgrade program" searches whether the firmware of the latest version exists in the firmware providing server 300 (8), and if there is the firmware of the latest version, compatibility between the searched firmware of the latest version and the firmware program installed in the print controlling device 100 may be determined (9).

If it is determined that the searched firmware of the latest version is compatible, the firmware of the latest version may be received from a CMS server 300-2 (10) and the firmware of the image forming apparatus 200 may be upgraded using the received firmware of the latest version (11).

In FIG. 3, the firmware of the latest version is received through a separate CMS server, but this is only an example. The firmware of the latest version may be received from the firmware providing server 300-1. Searching and receiving firmware may be performed through a CMS server.

FIG. 4 to FIG. 13 are views illustrating various examples of a user interface window displayed on the print controlling device in FIG. 1.

Figure 4:
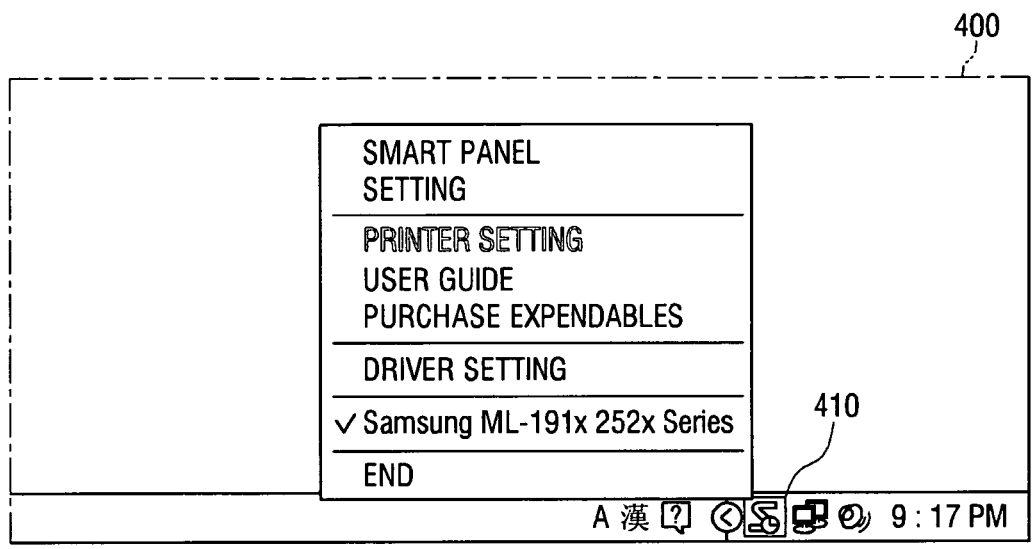
FIG. 4 to FIG. 13 are views illustrating various examples of a user interface window displayed on the print controlling device in FIG. 1.

Referring to FIG. 4, the user interface window 400 displays that a real-time upgrading program is being operated (410). Specifically, the upgrade policy unit 150 in FIG. 2 may be implemented as a background program. Accordingly, the operation of searching whether there is the firmware or the program of the latest version may be performed at the timing pre-set by the upgrade policy or at the timing of executing the firmware upgrade program. The firmware upgrade program is a program in which the function of the search unit 160, the determination unit 170, the upgrade unit 180, and the control unit 190 in FIG. 2 are implemented as a single algorithm. Separate programs corresponding to each component may be implemented or programs may be operated in association with each other.

Figure 5:
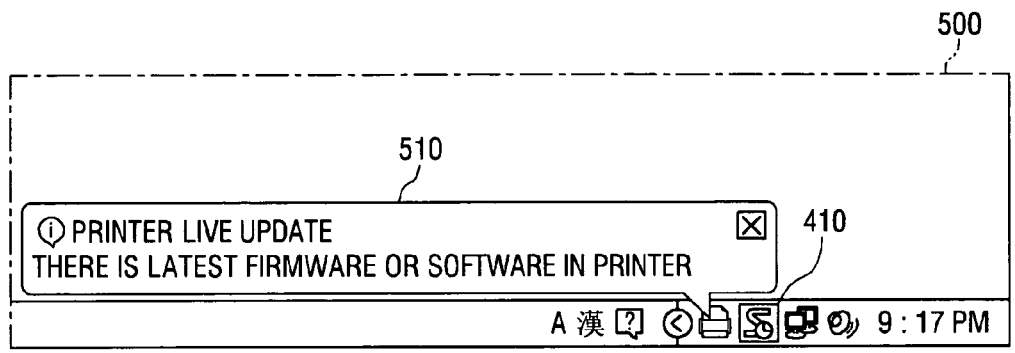

Referring to FIG. 5, the user interface window 500 includes the message area or tool tip 510 for displaying whether it is possible to perform firmware-upgrading. Specifically, if the firmware of the latest version is searched and identified and it is determined that the firmware of the latest version is compatible, the information that there exist installable firmware may be displayed for a user in a tooltip 510 as illustrated in FIG. 5.

Figure 6:
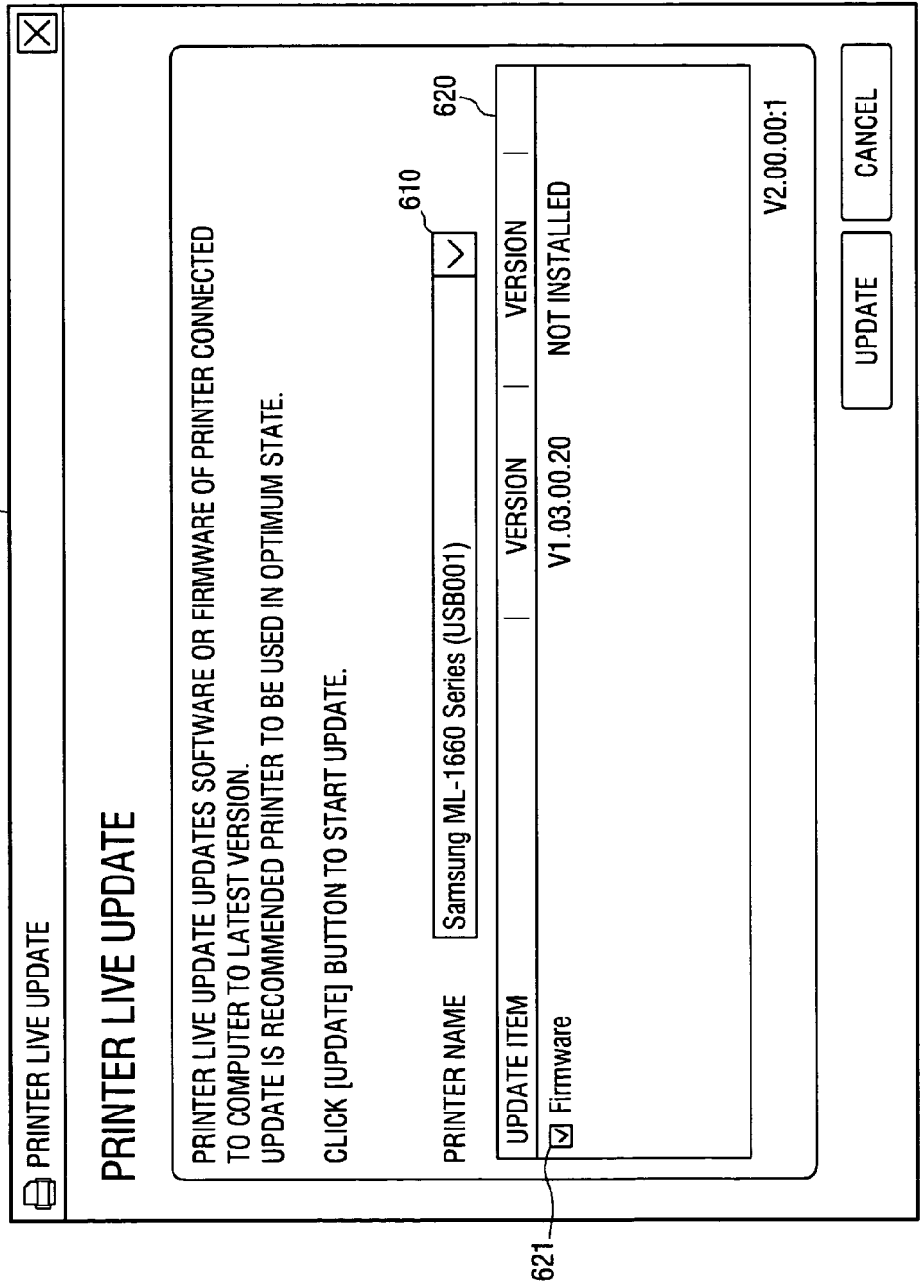
Figure 7:
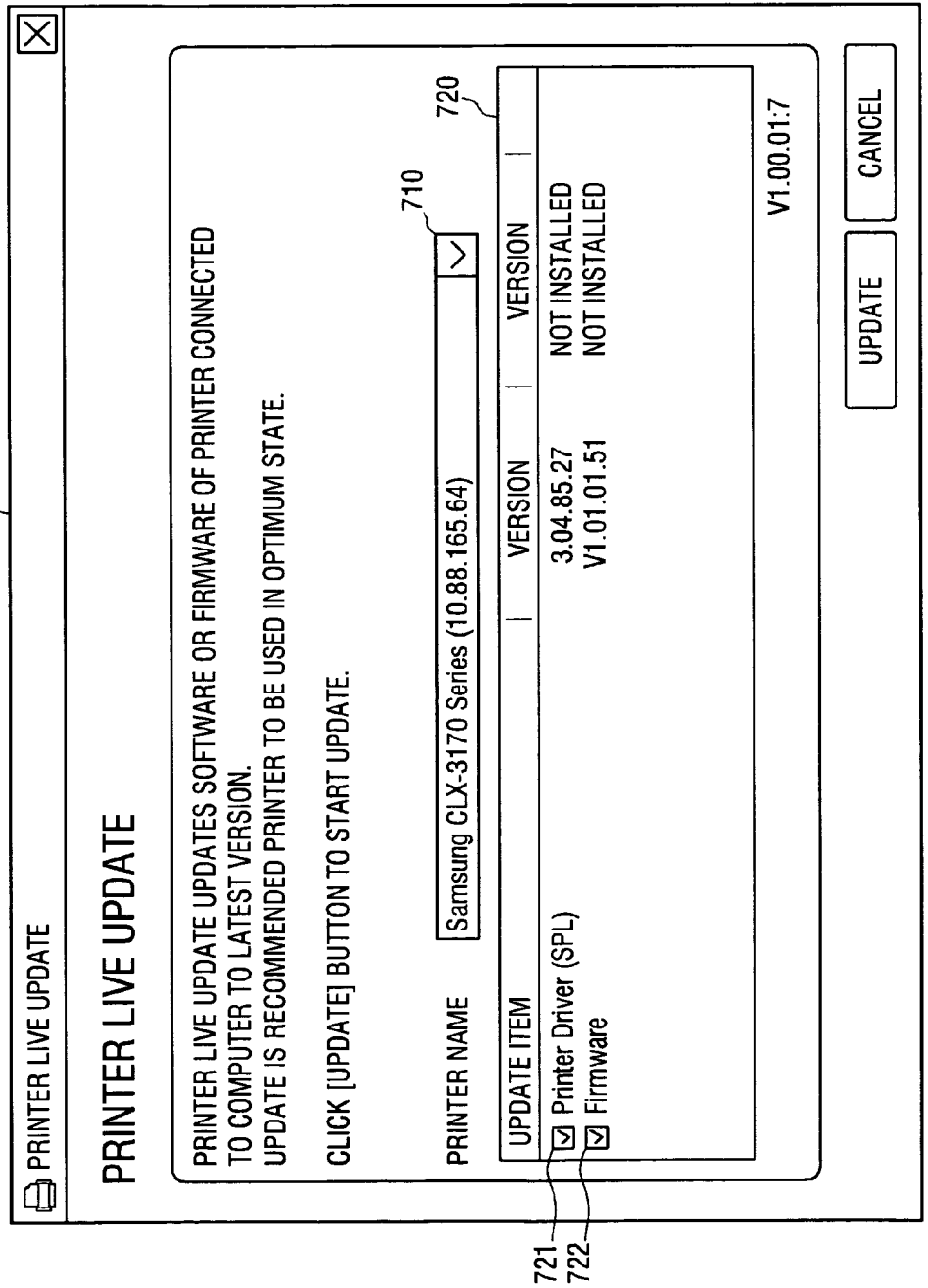

If the user selects the displayed tooltip, the user interface window may be displayed as illustrated in FIG. 6 or FIG. 7. In the exemplary embodiment, the operation of upgrading is performed according to a user's selection, but upgrading may be performed automatically according to a predetermined upgrade policy without a user's selection.

FIG. 6 illustrates an example of the user interface window 600 which is displayed for a user when the firmware of the latest version is searched for and identified, and the FIG. 7 illustrates an example of the user interface window 700 which is displayed for a user when the firmware and the program of the latest version are searched for and identified together.

Referring to FIG. 6, the user interface window 6 includes the area 610 for displaying the image forming apparatus in which upgrading is to be performed and the area 620 for displaying the identified firmware of the latest version.

The area 610 may display the image forming apparatus 200 which is connected to the print controlling device 100. In FIG. 6, a single image forming apparatus is displayed, but a plurality of image forming apparatuses may be displayed. Alternatively, only the image forming apparatus in which the firmware of the latest version is searched may be displayed.

The area 620 may display the firmware of the latest version which is searched by the search unit 160 and whose compatibility is acknowledged. The search unit 160 may display all of the searched firmware of the latest version, or may additionally provide information regarding the firmware of the latest version with compatibility.

Referring to FIG. 7, the user interface window 700 includes the area 710 for displaying the image forming apparatus in which upgrading is to be performed and the area 720 for displaying the searched firmware and program of the latest version regarding the image forming apparatus.

Through the user interface window 600 or the user interface window 700, a user may check firmware or firmware and program which can be upgraded.

Figure 8:
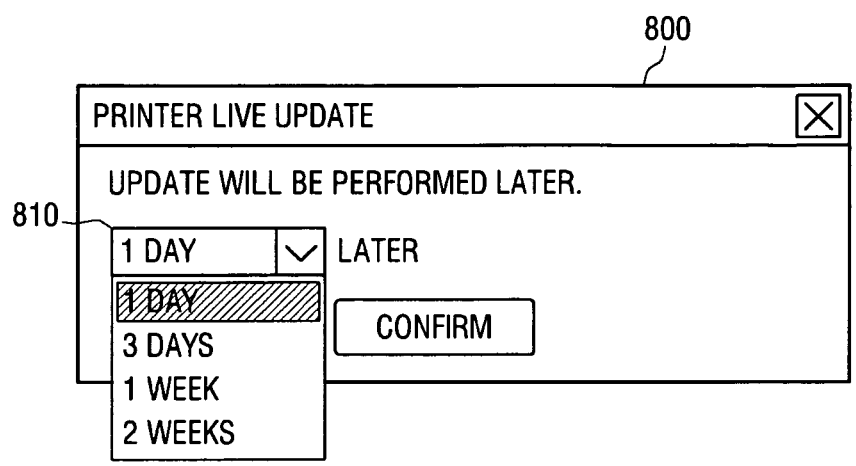

If a user selects "cancel" on the user interface window 600 or the user interface 700, the operation of setting an upgrading timing may be performed as illustrated in FIG. 8. If the user selects "update", the operation of receiving firmware or a program may be performed.

FIG. 8 illustrates an example of the user interface window 800 for setting a time of installing the firmware of the latest version.

Referring to FIG. 8, the user interface window 800 includes the area 810 in which a user sets the timing of upgrading the currently searched firmware and/or program. Specifically, if a user does not wish to update the firmware immediately, the user may set the upgrading timing through the area 810. It is understood that user may enter any time by typing or by clicking calendar provided by the window.

FIG. 9 to FIG. 13 are examples of the user interface window displayed sequentially for a user if "update" is selected in FIG. 7.

Figure 9:
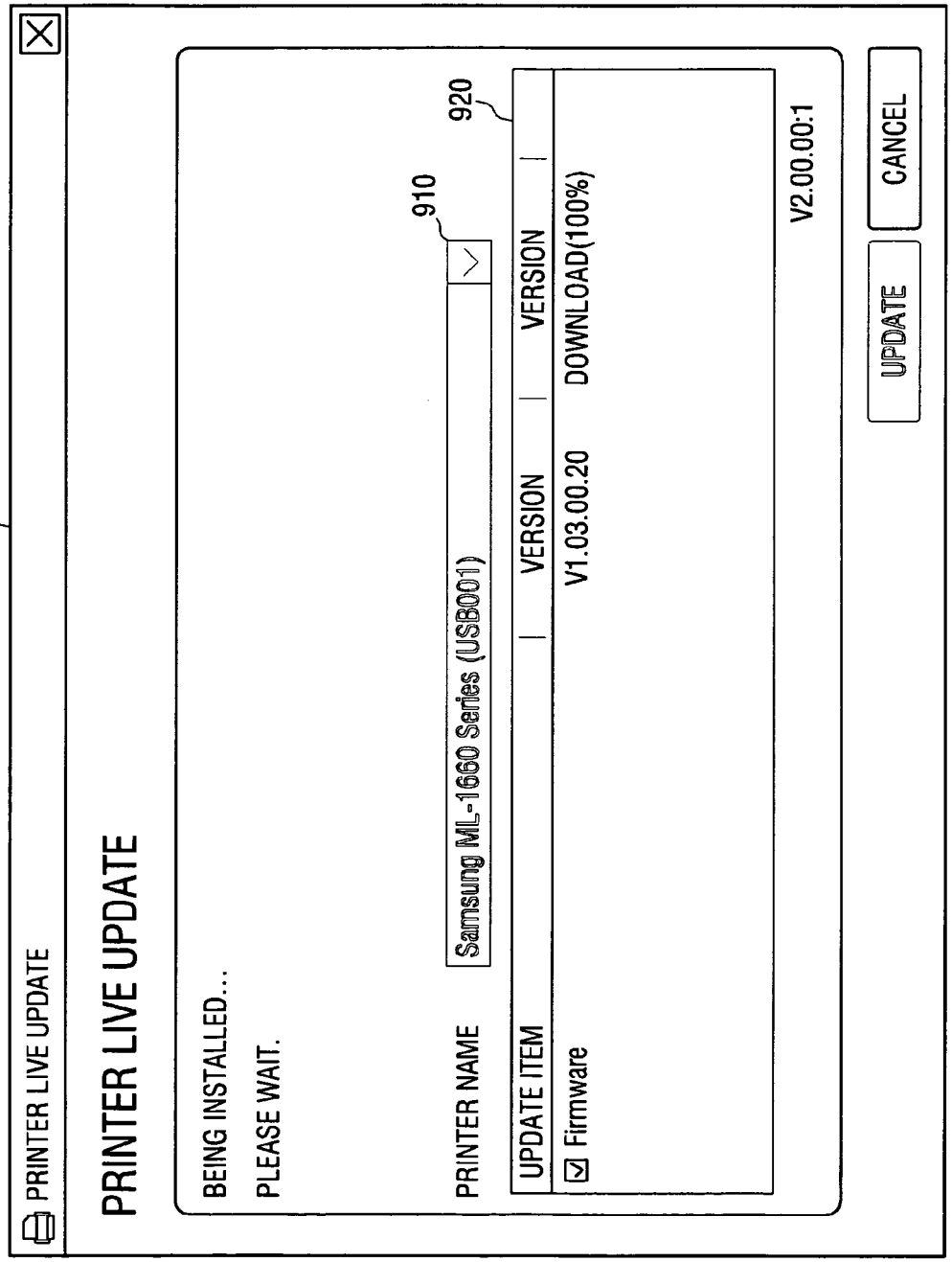

Referring to FIG. 9, the user interface window 900 includes the area 910 for displaying the image forming apparatus in which the latest firmware is to be applied and the area 920 for displaying the searched firmware of the latest version regarding the image forming apparatus. One can see that the firmware of the latest version which has been searched according to a user's command to upgrade is downloaded to the print controlling device 100 by comparing the area 920 and the area 620 in FIG. 6.

Figure 10:
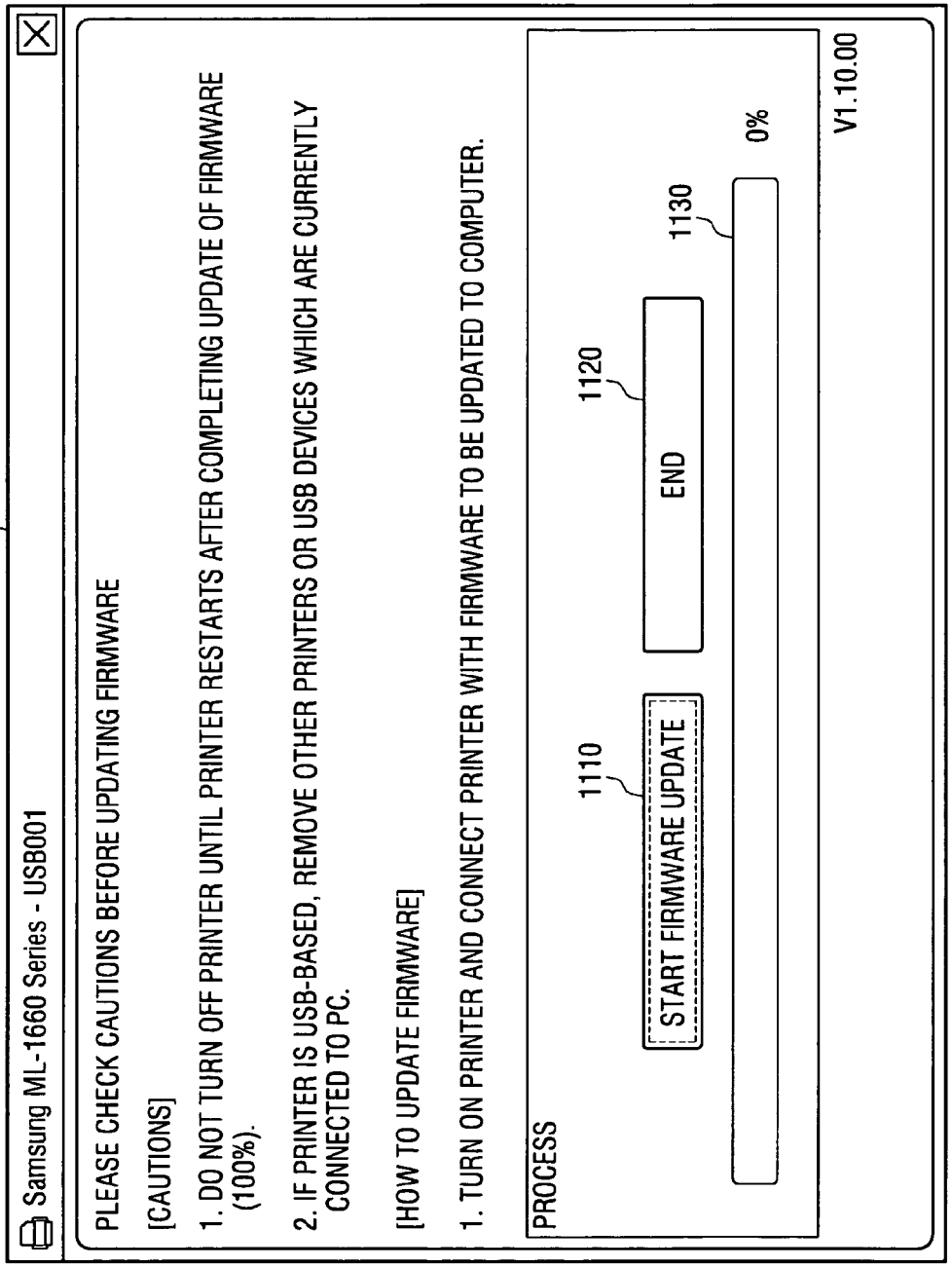

Referring to FIG. 10, the user interface window 1100 displays caution during firmware-upgrading, and includes the area for receiving a command to start firmware-upgrading (1110), the area for receiving a command to end firmware-upgrading (1120), and the area for displaying the process of firmware-upgrading (1130).

Figure 11:
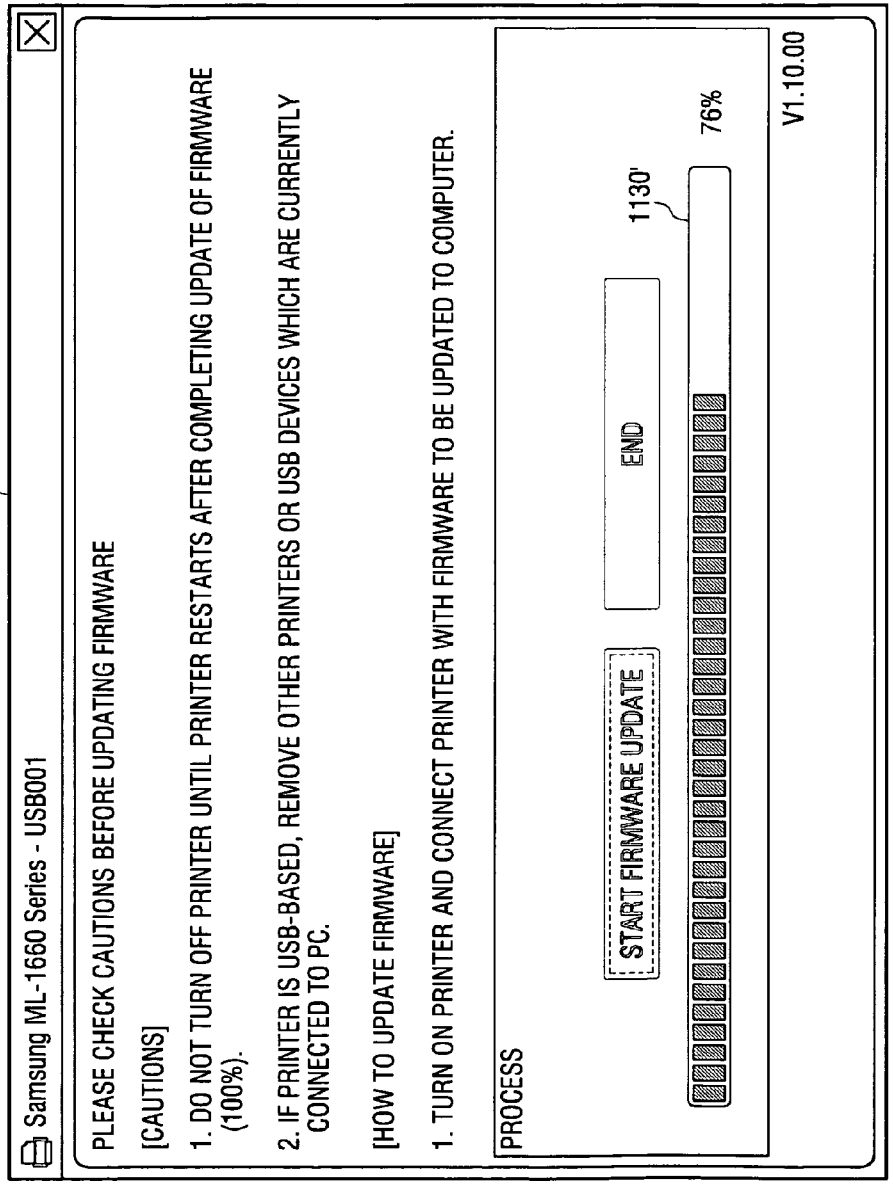

If a user follows instructions in the caution and selects the area for starting firmware-upgrading 1110, the firmware of the latest version stored in the print controlling device 100 may be transmitted to the image forming apparatus 200 as illustrated in FIG. 11.

Referring to FIG. 11, the area for displaying the process of firmware-upgrading 1130' shows the process of transmitting of the firmware of the latest version.

Figure 12:
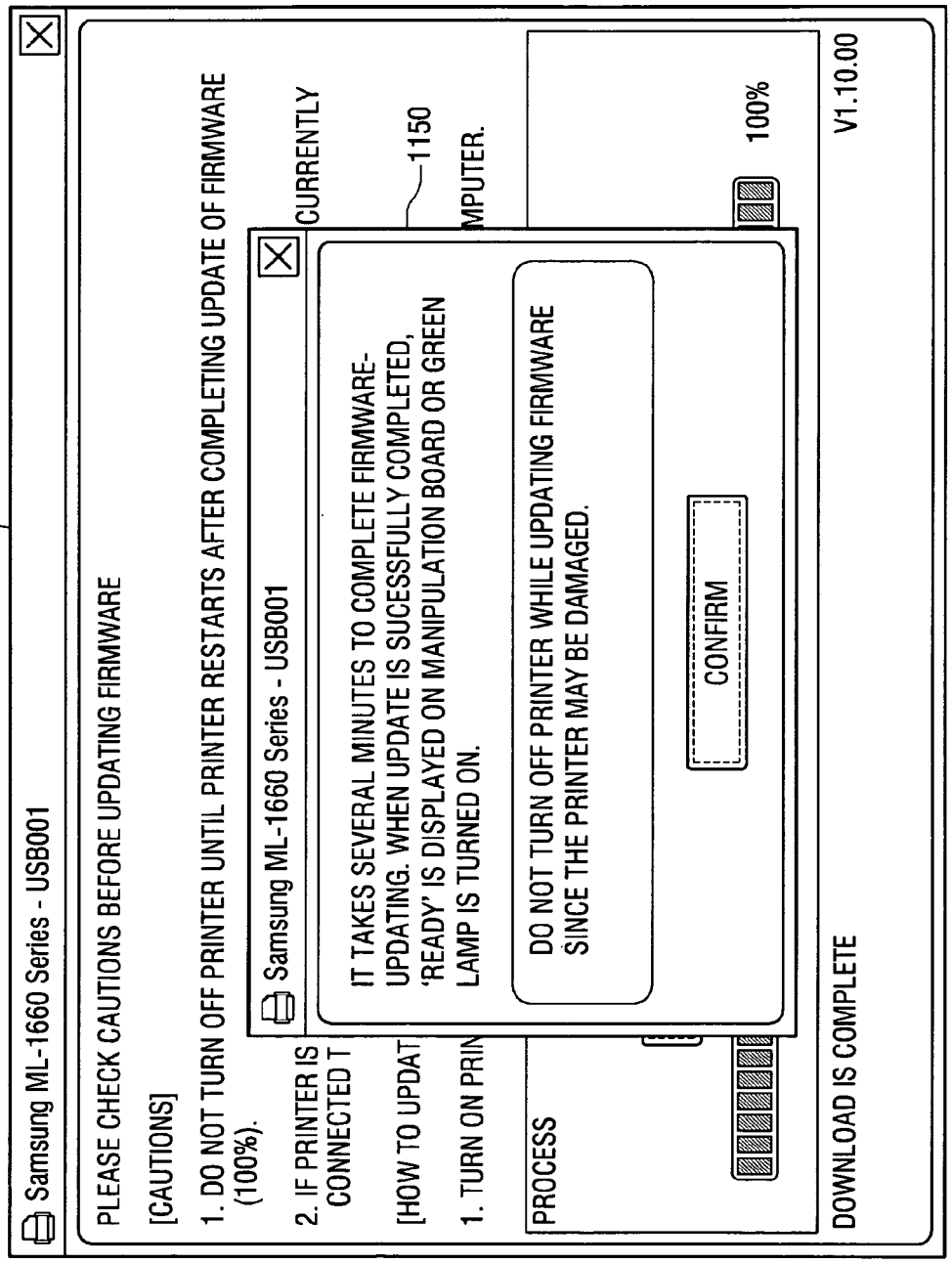

As such, the firmware of the latest version is transmitted to the image forming apparatus 200, the firmware of the image forming apparatus is upgraded, and cautions that a user need to take may be displayed in the cautions 1150 as illustrated in FIG. 12.

Figure 13:
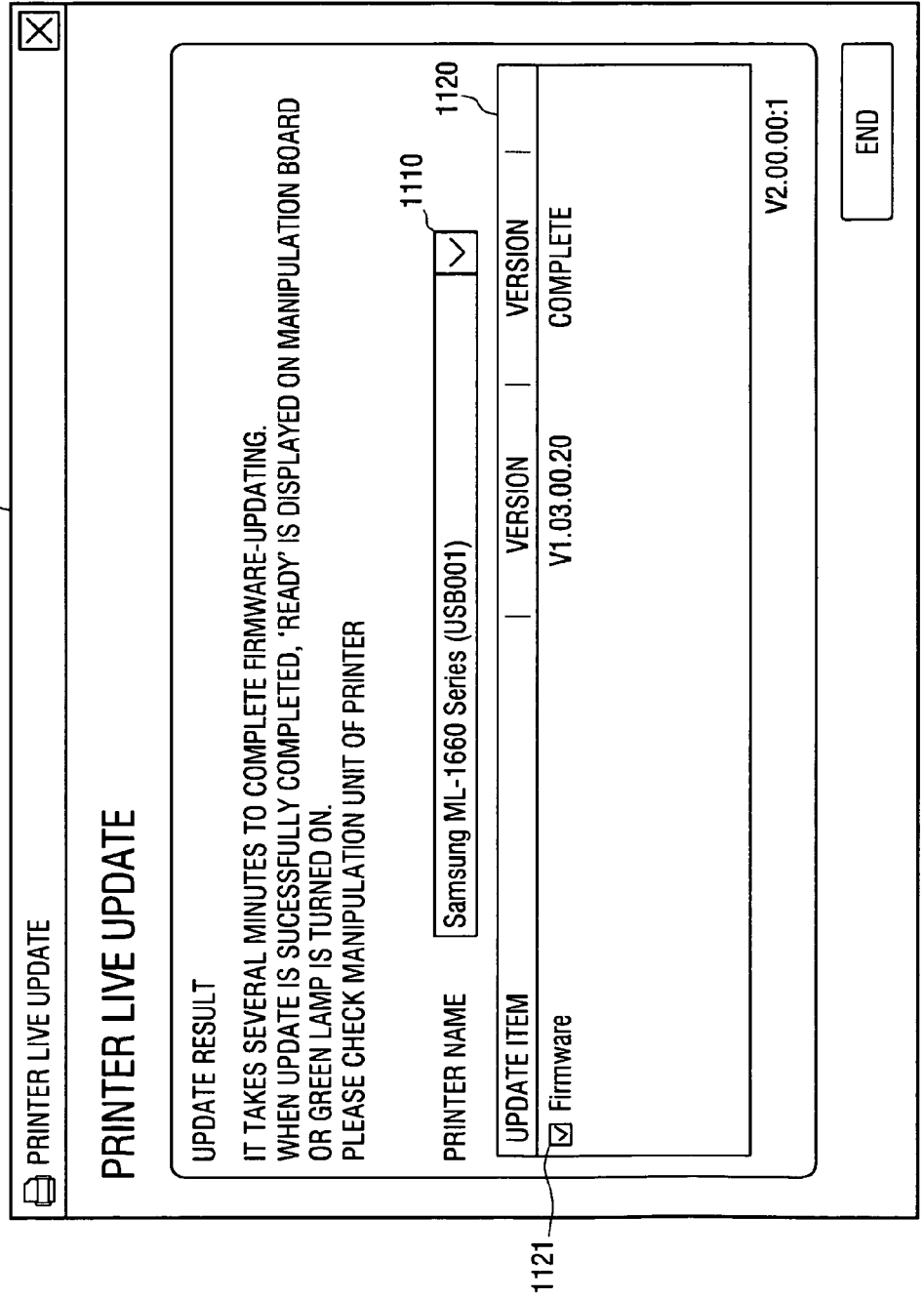

Once the firmware of the image forming apparatus 200 has been upgraded through the above process, completion of firmware-upgrading is displayed for a user as illustrated in FIG. 13.

Figure 14:
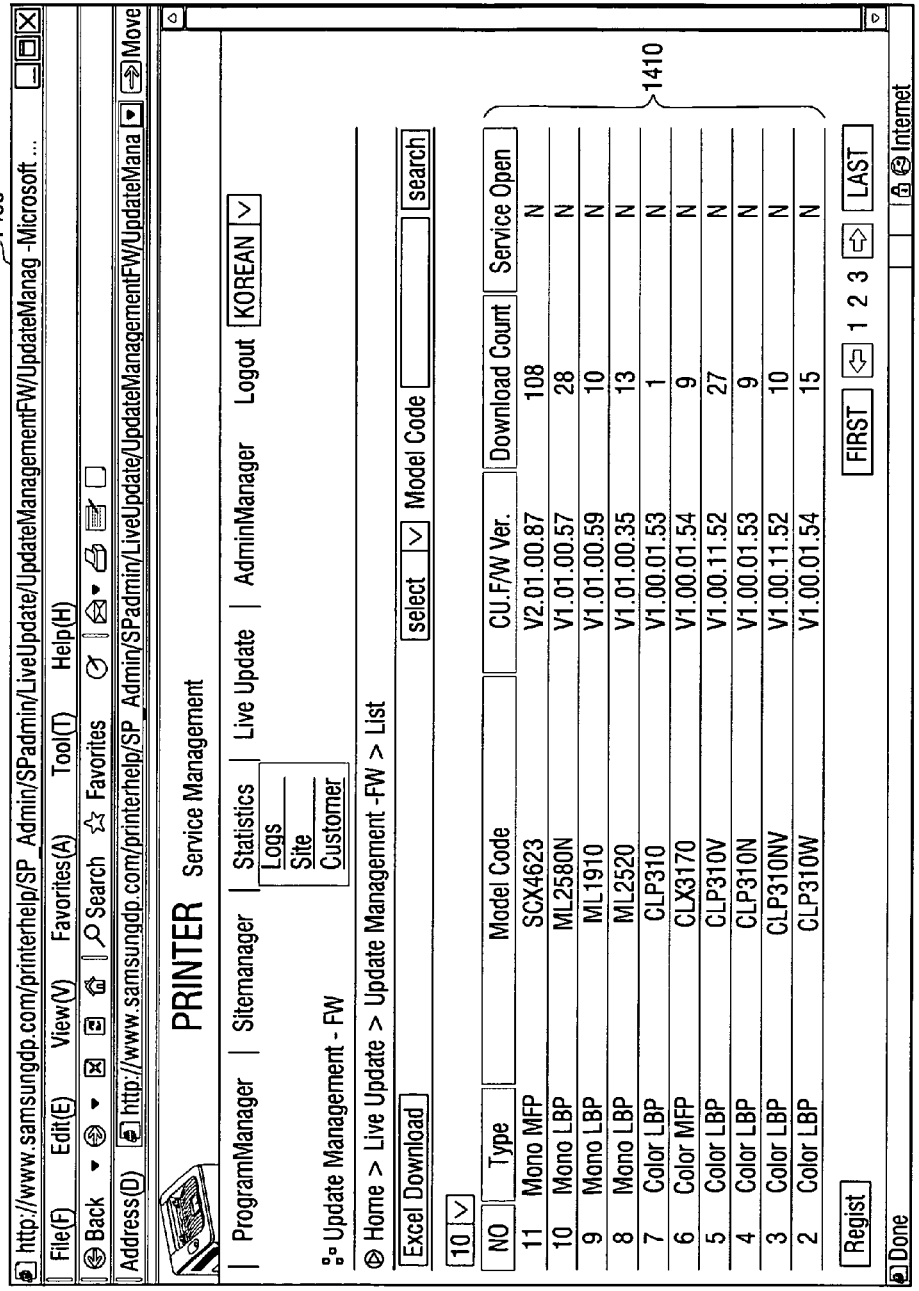
FIG. 14 to FIG. 16 are views illustrating various examples of a user interface window displayed on the firmware providing server in FIG. 1.
Figure 15:
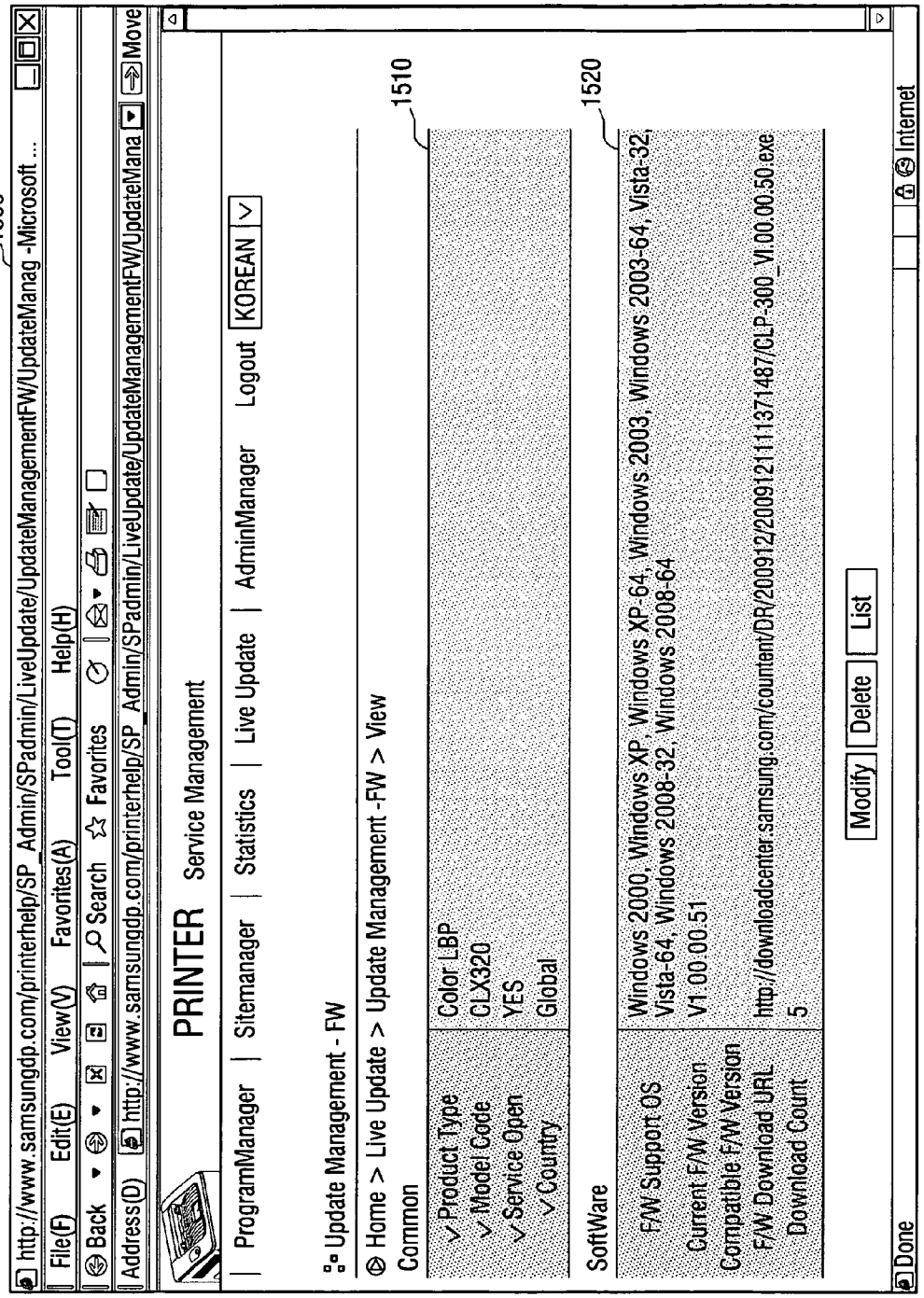
Figure 16:
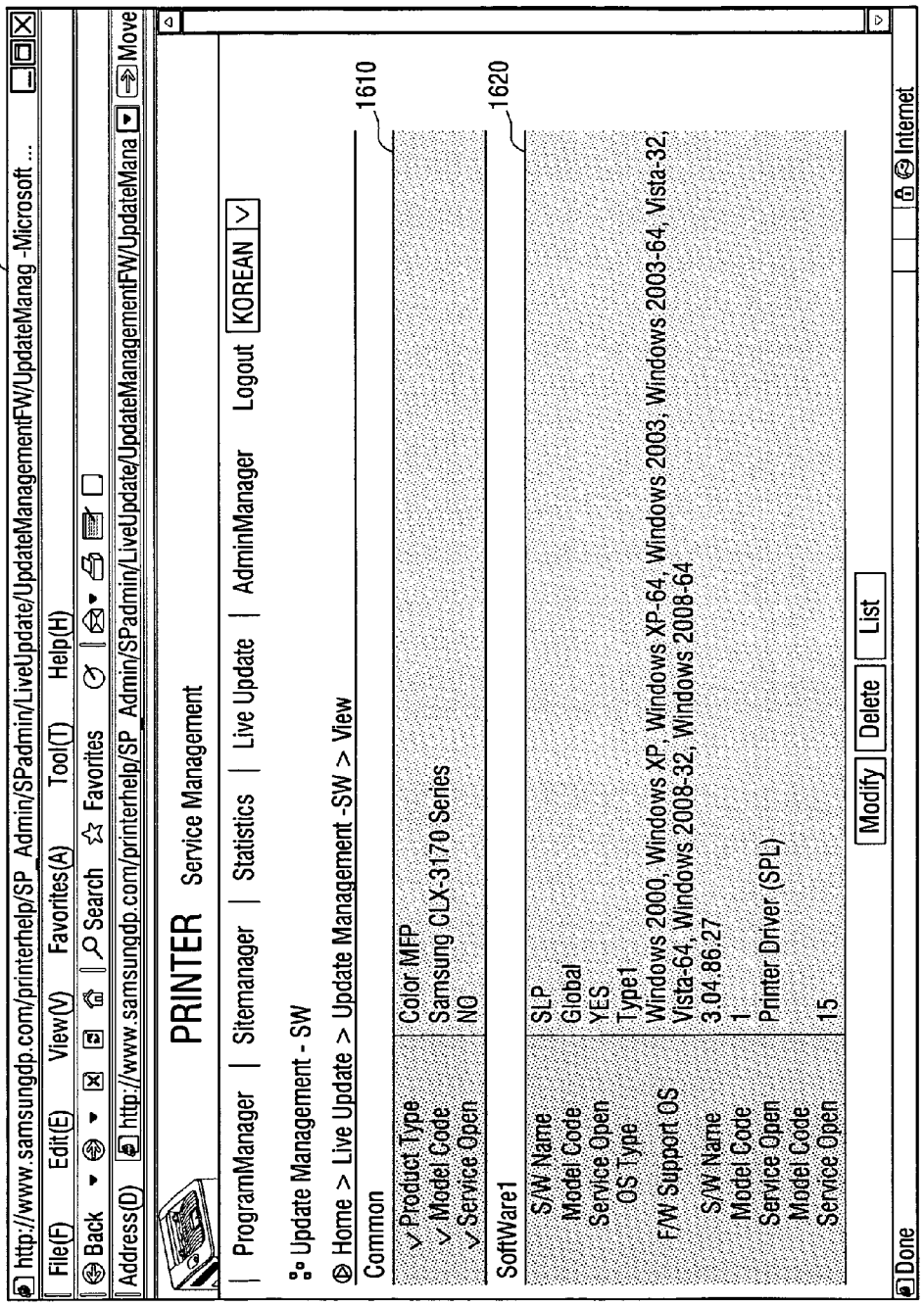

FIG. 14 to FIG. 16 are views illustrating examples of a user interface window which displays information regarding firmware or a program provided by the firmware providing server 300 on the print controlling device 110.

Referring to FIG. 14, the firmware providing server 300 provides firmware regarding a plurality of image forming apparatus models.

FIG. 15 is an example of the user interface window 1500 which may be displayed when one of the plurality of image forming apparatus models in FIG. 14 is selected. Specifically, the user interface window 1500 includes the area 1510 for displaying the type, model code, availability of service, and countries for upgrading regarding the selected image forming apparatus model and the area 1520 for displaying the type of operating program supported by firmware, information regarding the firmware of the latest version, and the number of firmware-downloading.

FIG. 16 is an example of the user interface window 1600 which may be displayed when one of the plurality of image forming apparatus models in FIG. 14 is selected. Unlike in FIG. 15, the user interface window 1600 displays information regarding a program rather than information regarding firmware. Specifically, the user interface window 1600 includes the area 1610 for displaying the name of model which requires upgrading and availability of upgrading service and the area 1620 for displaying the name of program, supported countries, supported operating program, and the number of downloading.

FIG. 17 is a view illustrating an example of compatibility information according to an exemplary embodiment.

Referring to FIG. 17, compatibility information includes version information of compatible program for each version of firmware. For instance, firmware version 1.01.0068 is compatible with 1.23.02 version of smart panel program and 3.0020.02 version of installer program.

Hereinbelow, detailed operation of determining compatibility of the firmware of the latest version using compatibility information will be described. If the version of firmware currently installed in the image forming apparatus 200 is 'v1.01.00.63', the version of smart panel is '1.22.05', and the version of installer program is '3.00.19.00', the search unit 160 may search three firmware of the latest version, 'v1.0100.68', v.01.00.72', and 'v1.0100.77'. However, since the firmware version of 'v1.0100.68', v.01.00.72', and 'v1.0100.77' requires the version of smart panel program which is more than 1.23, the determination unit 180 may determine that the three firmware of the latest version has no compatibility.

FIG. 18 to FIG. 27 are views illustrating examples of registries stored and/or displayed in the print controlling device in FIG. 1.

Referring to FIG. 18, the storage unit 130 stores an upgrade policy as registry information. Specifically, the registry information regarding the upgrade policy may be stored and/or displayed in the lower area 1810 of "HKEY_CURRENT_USER" on Window.

Here, "LastUpdateDate" registry 1821 is the area for recording the date on which final upgrading is performed, "LUpdate" registry 1822 is the area for recording upgrading frequency, and "SMUpadataPath" is the area for recording the location in which an upgrading program is stored when the upgrading is performed at a pre-determined timing (the timing set on "LUpate" registry).

Figure 19:
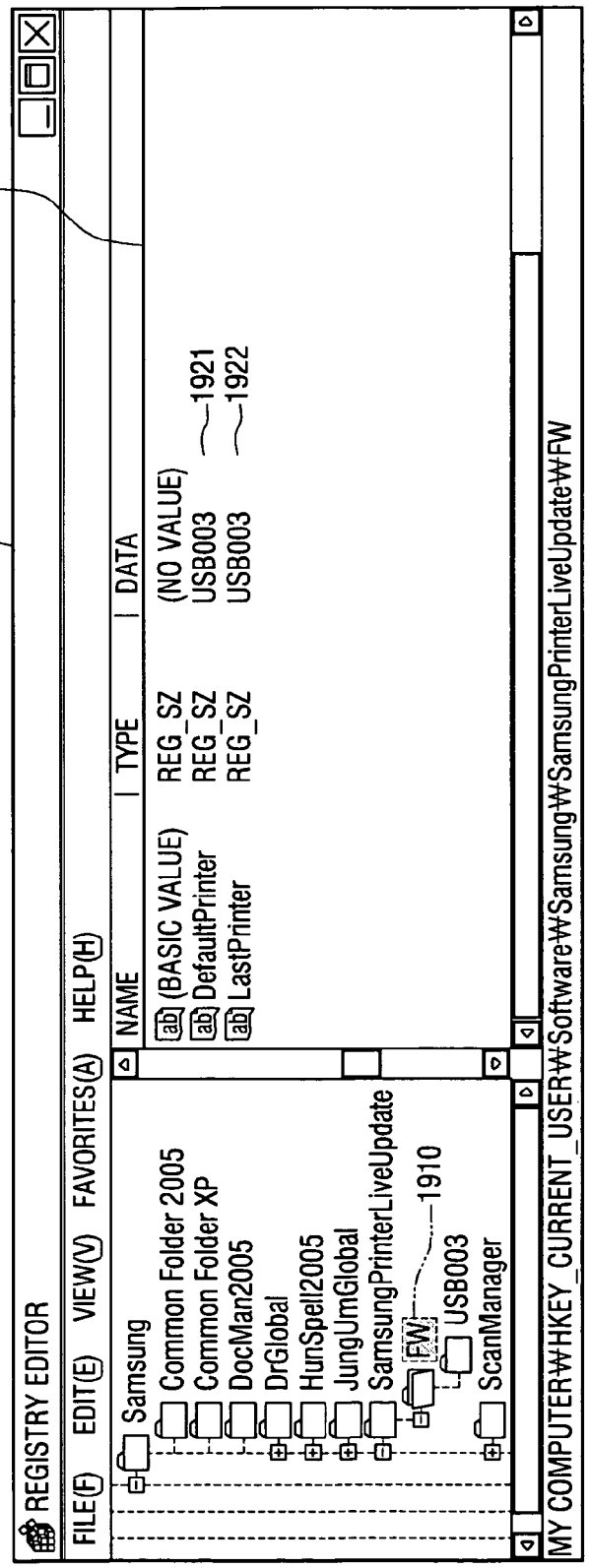

Referring to FIG. 19, the storage unit 130 stores information regarding a recently used image forming apparatus and a default image forming apparatus. Specifically, the information regarding a recently used image forming apparatus and a default image forming apparatus may be stored (and/or displayed) in the lower area 1910 of 'registry information regarding the upgrade policy'.

Here, "DefaultPrinter" registry 1921 is the area for recording the port of the image forming apparatus set as the default, and "LastPrinter" registry 1922 is the area for recording the port of a recently used image forming apparatus.

Referring to FIG. 20 and FIG. 21, the storage unit 130 stores information regarding the firmware of the image forming apparatus. Specifically, information regarding the firmware of a locally connected image forming apparatus may be stored and/or displayed in the lower area 2010, 2110 of 'registry information regarding the upgrade policy'. Here, FIG. 20 is an example of registry information when information regarding the firmware of a locally connected image forming apparatus is recorded, and FIG. 21 is an example of registry information whine information regarding the firmware of a image forming apparatus connected on network is recorded.

Here, "MACAddress" registry 2021, 2121 is the area for recording an MAC address in the case of a network port, "ModelCode" registry 2022, 2122 is the area for recoding the model code of an image forming apparatus which is used when confirming an actual upgrade target through communication with the image forming apparatus, "ModelName" registry 2023, 2123 is the area for recording the model name of the image forming apparatus, "SerialNumber" registry 2024, 2124 is the area for recording the serial number of the image forming apparatus, "UpdateStatus" registry 2025, 2125 is the area for recording whether firm-ware upgrading is completed, and "Version" registry 2026, 2126 is the area for recording the version of a currently installed firmware.

Figure 22:
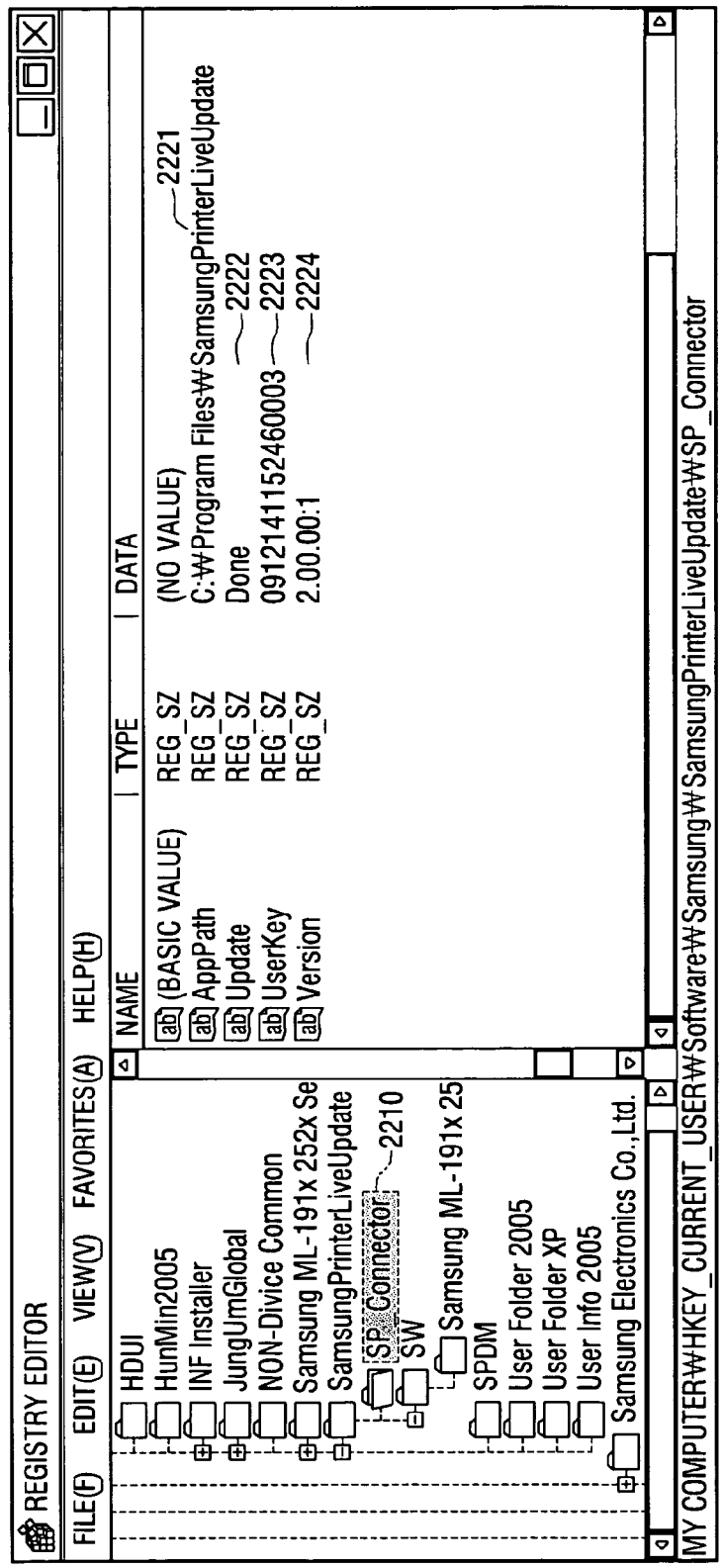

FIG. 22 illustrates an example of registry information regarding a background program which performs upgrading according to the upgrade policy. Specifically, the registry information regarding a background program may be stored and/or displayed in the lower area 2210 of "HKEY_LOCAL_MACHINE" on Window.

Here, "AppPath" registry 2221 is the area for recording the location in which the background program is stored, "Update" registry 2222 is the area for recording whether upgrading of the firmware of the latest version is completed, "UserKey" registry 2223 is the area for recording an ID number, and "Version" registry 2224 is the area for recording the version of a background program.

The ID number is the number designated to each computer to identify computers used by a user, and thus should not be overlapped. Accordingly, the ID number may be generated by combining upgrading time information with a random number at the timing of upgrading.

Figure 23:
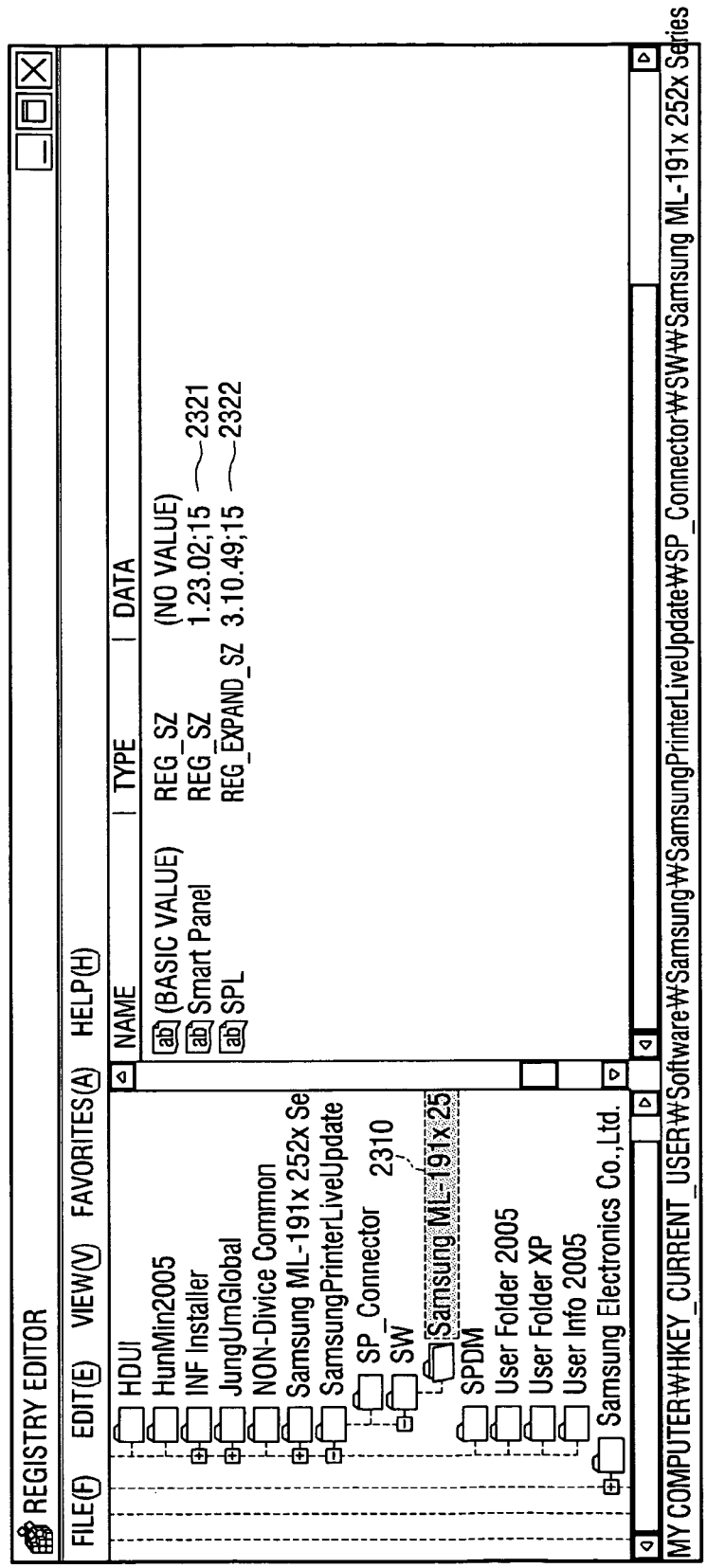

Referring to FIG. 23, the storage unit 130 stores information regarding a program installed in the print controlling device 100. Specifically, registry information regarding information on a program installed in the print controlling device 100 may be stored and/or displayed in the lower area 2310 of "HKEY_LOCAL_MACHINE" on Window.

Here, "SmartPanel" is a program to control the image forming apparatus and "SmartPanel" registry 2321 includes information on "SmartPanel" version. "SPL" is a printer driver and "SPL" registry 2322 includes information regarding the version of the printer driver. Such information regarding the program is stored when the pertinent program is installed in the print controlling device 100 and the pertinent registry may be deleted when the pertinent program is deleted.

Figure 24:
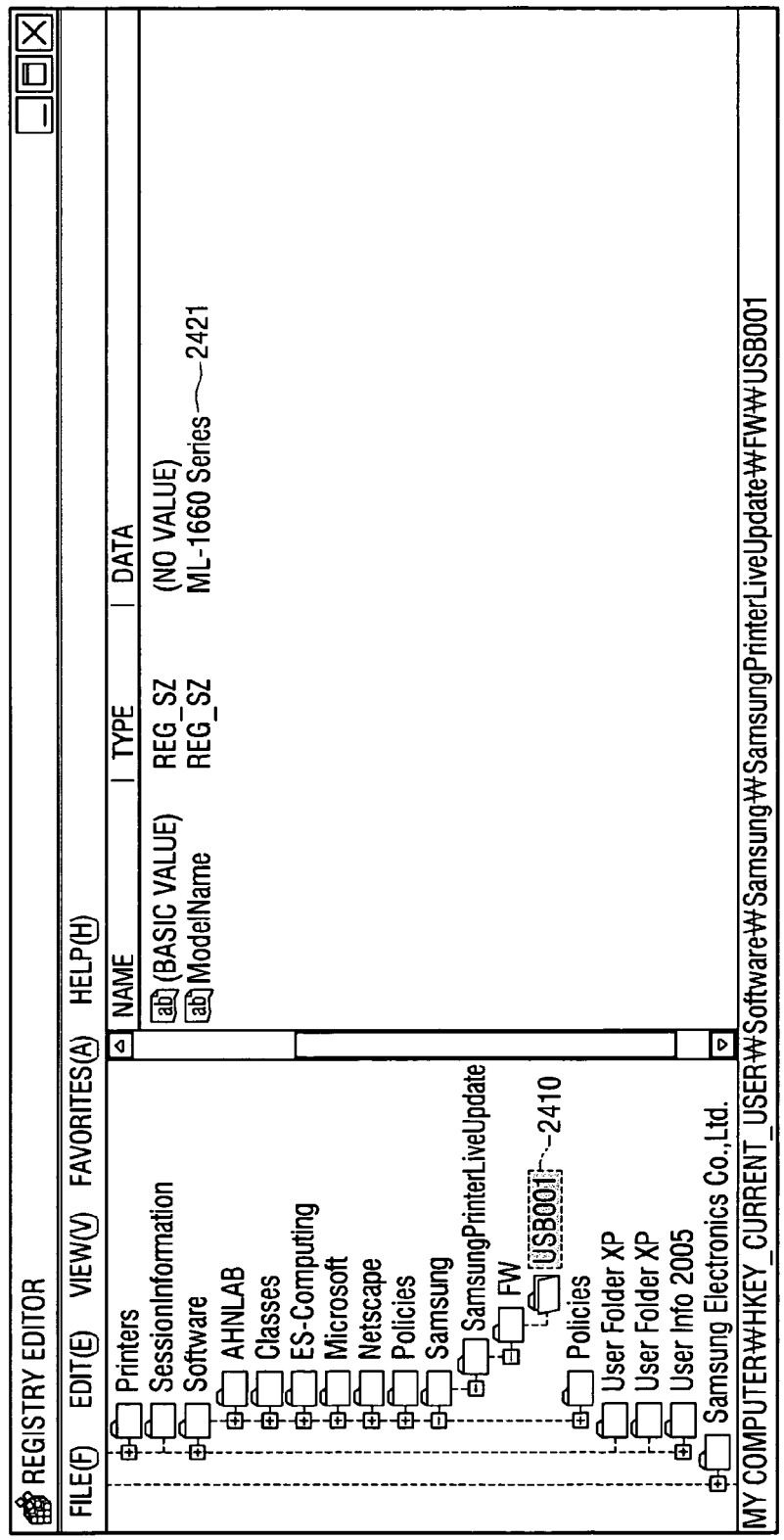

FIG. 24 shows registry information before firmware information is recorded. If only the model name of the image forming apparatus is included initially and then information regarding the image forming apparatus is received through the communication interface unit 110, information regarding the firmware of the image forming apparatus may be stored as illustrated in FIG. 20 and FIG. 21.

Figure 25:
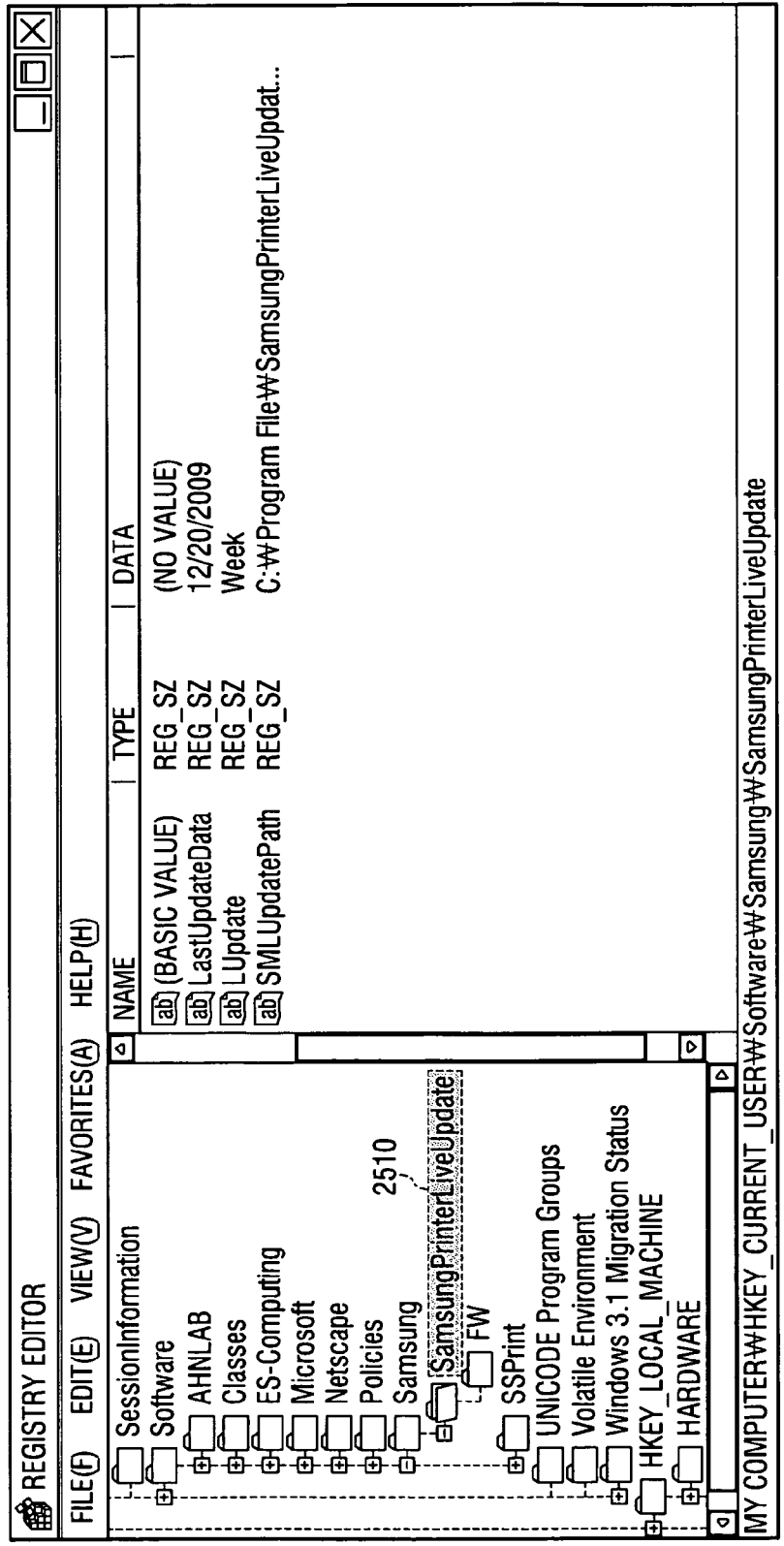

FIG. 25 illustrates an example of registry information regarding the upgrade policy when firmware is upgraded. One can see that the registry information regarding the upgrade policy in FIG. 25 is included while information regarding the firmware of the image forming apparatus is deleted in the lower area of the area 2510 in which such registry information is recorded by comparing FIG. 25 with FIG. 18.

That is, since firmware-upgrading is performed before firmware information is acquired through the pertinent image forming apparatus, the area for storing firmware information of the image forming apparatus is deleted from the lower area of the area for storing registry information regarding the upgrade policy.

In the above explanation with reference to FIG. 18 to FIG. 25, various information is stored in registry on Window, but the present invention is not limited to the embodiment on Window and may be applied after modification in other operating system such as Linux.

Figure 26:
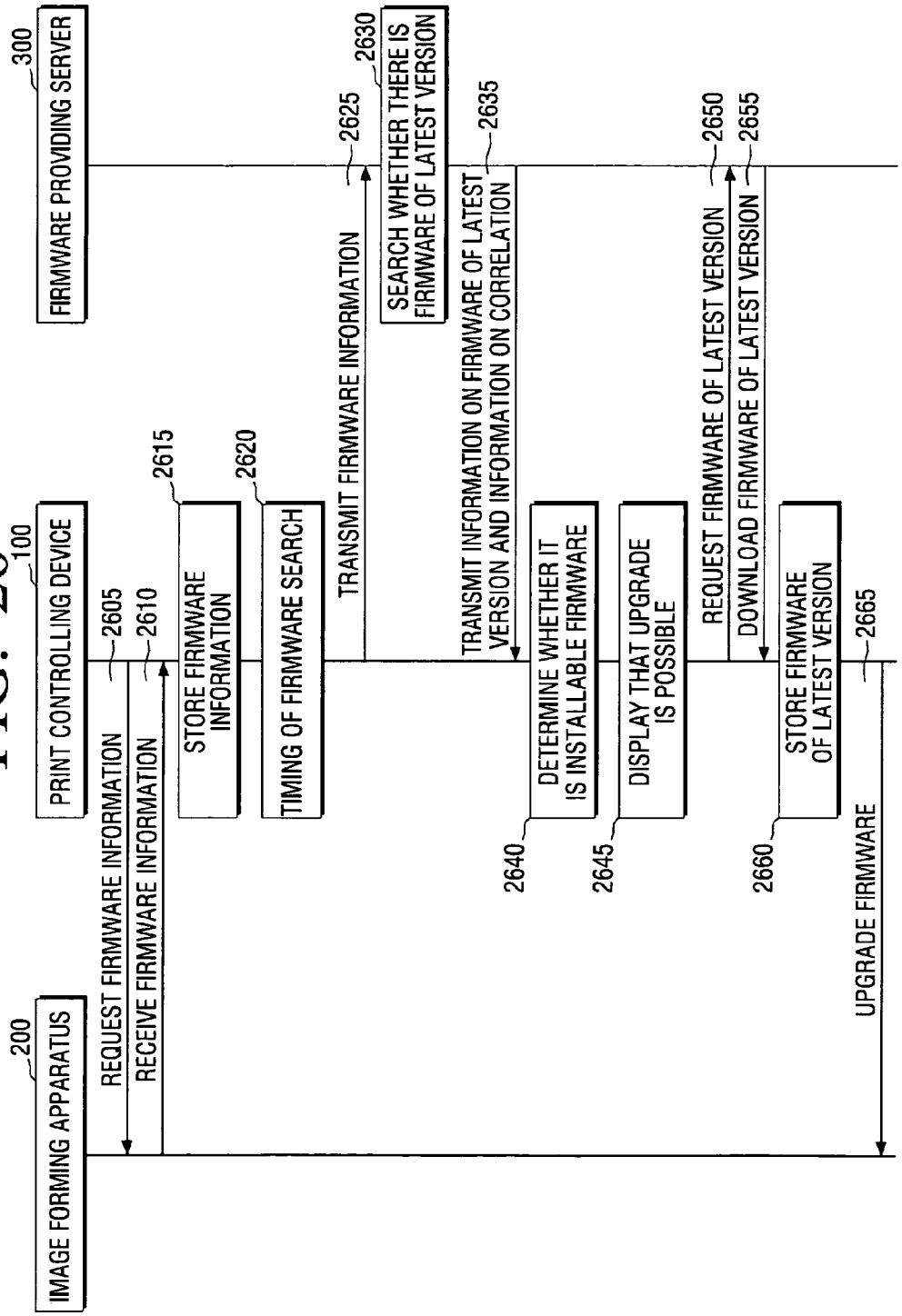

FIG. 26 is a sequence diagram provided to explain a method for upgrading firmware according to the first exemplary embodiment of the present invention.

The print controlling device 100 requests the image forming apparatus 200 to send information regarding firmware (2605) and may receive the information regarding firmware from the image forming apparatus 200 (2610). The information regarding firmware may be acquired in the process of printing through the pertinent image forming apparatus. The received information regarding the firmware of the image forming apparatus 200 is stored in the storage unit 130 (2615). Specifically, as described above with reference to FIG. 20 and FIG. 21, firmware information may be stored in the form of registry.

Once an upgrading time set and/or displayed in the upgrade policy or a user's command is received (2620), the print controlling device 100 transmits firmware information to the firmware providing server 300 (2625) and the firmware providing server 300 may search to identify whether there is the firmware of the latest version based on the received firmware information (2630). The firmware providing server 300 transmits the search result and compatibility information (or correlation information) corresponding to the firmware of the latest version to the print controlling device 100 (2635), and the print controlling device 100 may determine compatibility between the firmware of the latest version and the program installed in the print controlling device 100 based on the received information regarding the firmware of the latest version and compatibility (2640). Detailed operation of determining compatibility has already been described with reference to the determination unit 170 in FIG. 2 and thus will be omitted.

If it is determined that the firmware of the latest version is installable in the image forming apparatus, it may be displayed for a user (2645). However, such operation may be omitted.

Once the searched firmware of the latest version is upgraded according to a user's command to upgrade firmware and the upgrade policy, the print controlling device 100 requests the firmware providing server 300 to transmit the pertinent firmware (2650) and may download firmware accordingly (2655). Once the firmware of the latest version is received, the print controlling device 100 may store the received firmware of the latest version (2660), and upgrade the firmware of the image forming apparatus 200 by transmitting the stored firmware of the latest version to the pertinent image forming apparatus 200 (2665).

Figure 27:
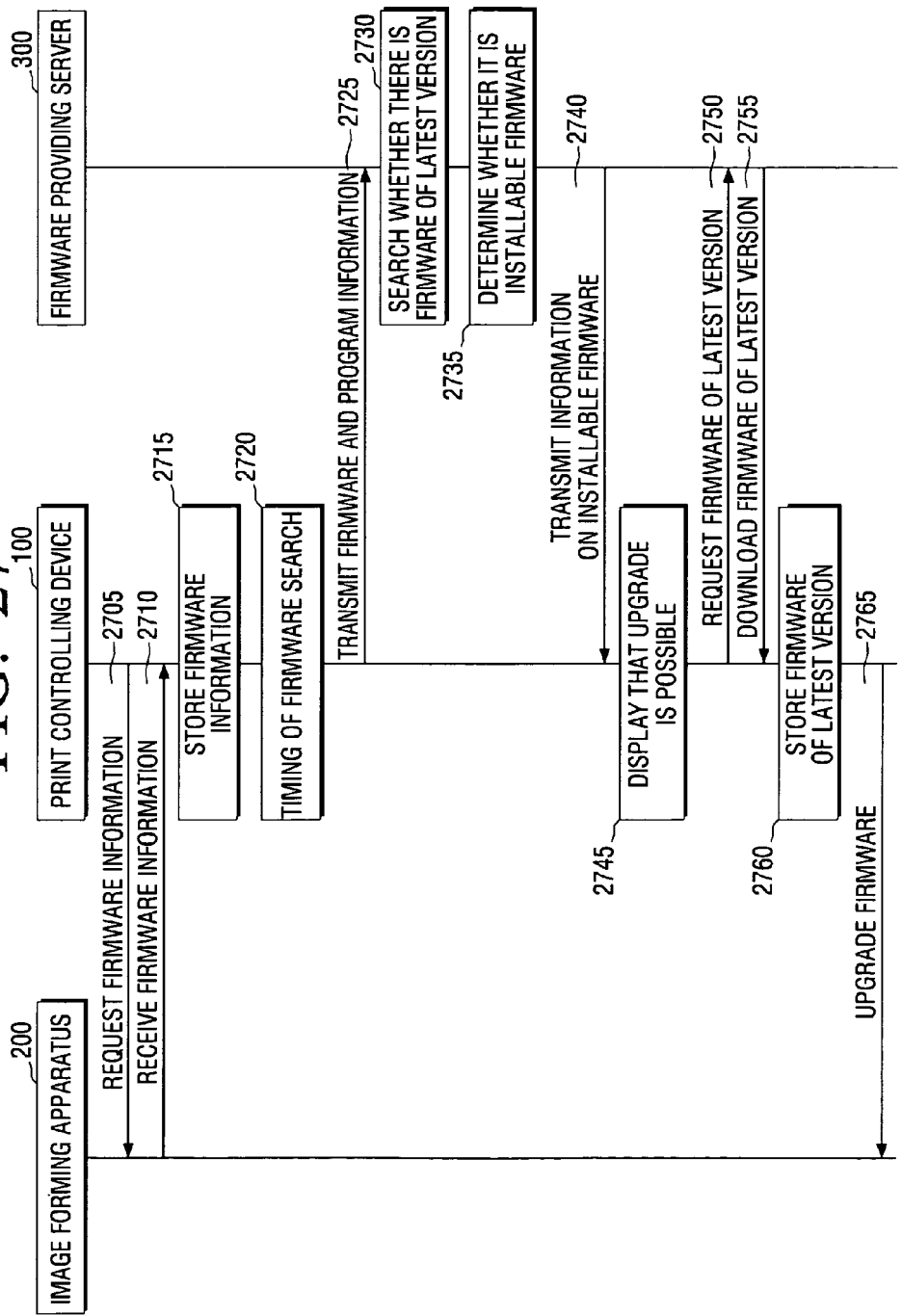

FIG. 27 is a sequence diagram provided to explain a method for upgrading firmware according to the second exemplary embodiment of the present invention.

One can see that the operation of determination (2640) by the print controlling device 100 in FIG. 26 is performed in the firmware providing server 200 by comparing FIG. 26 with FIG. 27. The method for upgrading firmware in FIG. 27 will be explained based on the above difference.

First of all, the print controlling device 100 may request the image forming apparatus to send information regarding firmware of the image forming apparatus 200 (2705) and receive information regarding the firmware from the image forming apparatus 200 (2710). The received information regarding the firmware of the image forming apparatus 200 may be stored in the storage unit 130 (2715).

Once an upgrading timing set in the upgrade policy and a user's command is input (2720), the print controlling device 100 may transmit firmware information and program information regarding the image forming apparatus installed in the print controlling device 100 to the firmware providing server 300 (2725).

Subsequently, the firmware providing server 300 may search for firmware of the latest version based on the received firmware information (2730). If the firmware of the latest version is found, whether the searched firmware of the latest version is compatible with the program installed in the print controlling device may be determined using the received program information and pre-stored compatibility information (2835).

Afterwards, the firmware providing server 300 transmits the determination result to the print controlling device 100 (2740), and if there is installable and compatible firmware of the latest version, the print controlling device 100 may display it for a user (2745).

Since the subsequent operations (2750, 2755, 2760, 2765) are the same as the operations in FIG. 26 (2650, 2655, 2660, 2665), redundant explanation will be omitted.

According to the method for firmware-upgrading in the first and the second exemplary embodiment of the present invention, compatibility between the latest firmware installable in the image forming apparatus 200 and the program installed in the print controlling device 100 or the latest program is examined before firmware-upgrading is performed, and thus unnecessary firmware-upgrading may be prevented. The method for firmware-upgrading in FIG. 26 and FIG. 27 may be performed in a print controlling device having the structure illustrated in FIG. 2 and may also be performed in a print controlling device having other structure.

FIG. 28 is a sequence diagram provided to explain a method for upgrading firmware according to the third exemplary embodiment of the present invention.

The print controlling device 100 may request the image forming apparatus 200 to send information regarding firmware (2805) and receive information regarding firmware from the image forming apparatus 200 (2810). The received information regarding firmware of the image forming apparatus 200 may be stored in the storage unit 130 (2815).

If an upgrading timing set in the upgrade policy or a user's command is input (2820), the print controlling device 100 may transmit the firmware information and program information regarding the image forming apparatus installed in the print controlling device 100 to the firmware providing server 300 (2825).

Subsequently, the firmware providing server 300 may search for the firmware of the latest version based on the received firmware information and search for the program of the latest version based on the received program information (2830).

If the firmware of the latest version is identified, the firmware providing server 300 may determine whether the firmware of the latest version is compatible with the program installed in the print controlling device 100 based on the received program information (2840). If the firmware of the latest version is searched or identified along with the program of the latest version, the firmware providing server 300 may determine whether the firmware of the latest version is compatible with the program of the latest version and the pre-installed program.

Once compatibility is determined, the firmware providing server 300 may send information regarding the searched firmware of the latest version, information regarding the searched program of the latest version and compatibility of the firmware of the latest version to the print controlling device 100.

Subsequently, if there is installable firmware and/or program of the latest version, the print controlling device 100 which has received the above information may display that there is the firmware and/or program to be upgraded for a user (2845), or upgrading may be performed without displaying any information.

Afterwards, once the searched firmware of the latest version is upgraded according to a user's command to upgrade firmware and the upgrade policy, the print controlling device 100 requests the firmware providing server 300 to transmit installable firmware and/or program (2850) and may download the firmware and/or program of the latest version from the firmware providing server 300 accordingly (2855).

Once the firmware and/or program of the latest version is received, the print controlling device 100 may store the received firmware and/or the latest version (2860), upgrade the pertinent program of the print controlling device 100 using the stored program of the latest version, and upgrade the firmware of the image forming apparatus 200 by transmitting the stored firmware of the latest version to the pertinent image forming apparatus 100 (2870).

According to the method for upgrading firmware in the third exemplary embodiment of the present invention, firmware-upgrading is performed after compatibility between the latest firmware installable in the image forming apparatus 200 and the program installed in the print controlling device 100 is examined, and thus unnecessary firmware-upgrading can be prevented. In addition, a program related with the image forming apparatus 200 may be automatically upgraded. The firmware-upgrading method in FIG. 28 may be performed in a print controlling device having the structure illustrated in FIG. 2 and may also be performed in a print controlling device having other structure.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method for upgrading firmware (or software) of an image forming apparatus using a print controlling device, comprising: receiving firmware information regarding firmware installed in the image forming apparatus; identifying whether there exists a firmware version newer or later than that installed in the image forming apparatus using the received firmware information; determining whether the firmware of the newer or latest version is compatible with a program installed in the print controlling device using compatibility information when firmware of the newer or latest version exists; receiving the firmware of the newer or latest version from a firmware providing server according to the compatibility determination result; upgrading firmware of the image forming apparatus using the received firmware of the newer or latest version; and wherein the compatibility information is information identifying program versions supported by each version of firmware of the image forming apparatus.

2. The method according to claim 1, wherein the firmware information regarding the installed firmware comprises at least one of an MAC address, a model code, a model number and a serial number of the image forming apparatus.

3. The method according to claim 1, wherein the identifying comprises:

providing the firmware information to the firmware providing server; and receiving firmware information identifying firmware of the newer or latest version and the compatibility information regarding the compatibility from the firmware providing server.

4. The method according to claim 1, wherein the identifying comprises;

providing information regarding the firmware and the program installed in the print controlling device to the firmware providing server; and receiving firmware information regarding firmware of the newer or latest version which is compatible with the program installed in the print controlling device from the firmware providing server.

5. The method according to claim 1, wherein the print controlling device is connectable to a plurality of image forming apparatuses, wherein the identifying identifies whether there is firmware of the newer or latest version for each of the plurality of image forming apparatuses, and wherein the determining determines whether each of identified firmware of the newer or latest version is compatible with each of program installed in each print controlling apparatus.

6. The method according to claim 5, wherein the upgrading upgrades firmware of a recently used image forming apparatus and a default image forming apparatus with a highest priority.

7. The method according to claim 1, wherein the print controlling device includes a plurality of user accounts and programs corresponding to each user account, and wherein the determining determines whether the firmware of the newer or latest version is compatible with a program corresponding to a current user account.

8. The method according to claim 1, further comprising:
identifying whether there is a program version newer than or later than that installed in the print controlling device,
wherein the determining determines whether the identified firmware of the newer or latest version is compatible with the identified program of the newer or latest version.

9. The method according to claim 8, further comprising:
receiving a program of the latest version from the firmware providing server according to the program determination result; and
installing the received program of the newer or latest version in the print controlling device.

10. The method according to claim 1, wherein the program is at least one of a print driver and a firmware upgrade program.

11. The method according to claim 1, further comprising:
displaying that firmware-updating is possible if the identified firmware of the newer or latest version is compatible with the program installed in the print controlling device.

12. The method according to claim 1, further comprising:
storing the received firmware of the newer or latest version; and
setting a time of upgrading the firmware;
wherein the upgrading upgrades the firmware of the image forming apparatus using the stored firmware of the newer or latest version at the set time.

13. A print controlling device which is connectable to an image forming apparatus and a firmware providing server, comprising: a storage unit to store firmware information regarding firmware installed in the image forming apparatus; a search unit to identify whether there exists a firmware version newer than or later than that installed in the image forming apparatus using the stored firmware information; a determination unit to determine whether the searched firmware of the newer or latest version is compatible with a program installed in the print controlling device using compatibility information when firmware of the newer or latest version is identified; a communication interface unit to request and receive the firmware of the newer or latest version from a firmware providing server according to a compatibility determination result; an upgrade unit to upgrade firmware of the image forming apparatus using the received firmware of the newer or latest version; and
wherein the compatibility information is version information of a supportable program for each firmware of the image forming apparatus.

14. The print controlling device according to claim 13, wherein the firmware information regarding installed firmware comprises at least one of an MAC address, a model code, a model number, and a serial number.

15. The print controlling device according to claim 13, wherein the search unit searches for firmware of the newer or latest version by controlling the communication interface unit to provide the firmware information to the firmware providing server.

16. The print controlling device according to claim 13, wherein the search unit searches for information regarding firmware of the newer or latest version which is compatible with the program installed in the print controlling device by controlling the communication interface unit to provide the firmware information and program information regarding the program installed in the print controlling device.

17. The print controlling device according to claim 13, wherein the print controlling device is connectable to a plurality of image forming apparatuses, wherein the search unit searches to identify whether there exists firmware of the newer or latest version for each of the plurality of image forming apparatuses, and wherein the determination unit determines whether each version of identified firmware of the newer or latest version is compatible with each program installed in each print controlling device.

18. The print controlling device for upgrading firmware according to claim 17, wherein the upgrade unit upgrades firmware of a recently used image forming apparatus and a default image forming apparatus from among a plurality of image forming apparatuses with a highest priority.

19. The print controlling device for upgrading software or firmware according to claim 13, wherein the print controlling device includes a plurality of user accounts and programs corresponding to each user account, and wherein the determination unit determines whether the identified firmware of the newer or latest version is compatible with a program corresponding to a current user account.

20. The print controlling device according to claim 13, wherein the search unit identifies whether there is a program version newer or later than that installed in the print controlling device, and wherein the determination unit determines whether the identified firmware of the newer or latest version is compatible with the identified program of the newer or latest version.

21. The print controlling device according to claim 20, wherein the communication interface unit receives a program of the newer or latest version from the firmware providing server according to the determination result, and wherein the upgrade unit installs the received program of the newer or latest version in the print controlling device.

22. The print controlling device according to claim 13, wherein the program comprises at least one of a print driver and a firmware upgrading program.

23. The print controlling device according to claim 13, further comprising:
a user interface unit to display that firmware-upgrading is possible when the identified firmware of the newer or latest version is compatible with the program installed in the print controlling device.

24. The print controlling device according to claim 13, further comprising:
a user interface unit to receive a time of upgrading software or firmware,
wherein the storage unit stores the received firmware of the newer or latest version,
wherein the upgrade unit upgrades firmware of the image forming apparatus using the stored firmware of the newer or latest version at the set time for upgrading.

* * * * *

UNITED STATES PATENT AND TRADEMARK OFFICE
CERTIFICATE OF CORRECTION

PATENT NO.      : 8,701,100 B2
APPLICATION NO. : 12/923685
DATED           : April 15, 2014
INVENTOR(S)     : Jung et al.

It is certified that error appears in the above-identified patent and that said Letters Patent is hereby corrected as shown below:

On the Title Page Item [54] and in the Specification, Column 1, Line 3, (Title) after "UPGRADING" insert -- PROGRAM OR FIRMWARE --.

Signed and Sealed this
Twenty-second Day of July, 2014

Michelle K. Lee
*Deputy Director of the United States Patent and Trademark Office*